United States Patent
Abati et al.

(10) Patent No.: US 12,271,800 B2
(45) Date of Patent: Apr. 8, 2025

(54) CONDITIONAL COMPUTATION FOR CONTINUAL LEARNING

(71) Applicant: QUALCOMM Incorporated, San Diego, CA (US)

(72) Inventors: Davide Abati, Amsterdam (NL); Babak Ehteshami Bejnordi, Amsterdam (NL); Jakub Mikolaj Tomczak, Diemen (NL); Tijmen Pieter Frederik Blankevoort, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 1020 days.

(21) Appl. No.: 17/097,811

(22) Filed: Nov. 13, 2020

(65) Prior Publication Data

US 2021/0150345 A1 May 20, 2021

Related U.S. Application Data

(60) Provisional application No. 62/935,147, filed on Nov. 14, 2019.

(51) Int. Cl.
*G06N 3/02* (2006.01)
*G06N 3/04* (2023.01)
(Continued)

(52) U.S. Cl.
CPC ............... *G06N 3/02* (2013.01); *G06N 3/04* (2013.01); *G06N 3/0464* (2023.01); *G06N 3/048* (2023.01);
(Continued)

(58) Field of Classification Search
CPC ...... G06N 20/10; G06N 3/0464; G06N 3/048; G06N 3/0495; G06N 3/08; G06N 3/063; G06N 3/02; G06N 3/04; G06F 18/285
See application file for complete search history.

(56) References Cited

U.S. PATENT DOCUMENTS

| 11,615,322 B1* | 3/2023 | Thomas | G11C 7/22 717/145 |
| 11,829,869 B2* | 11/2023 | Lacoste | G06F 18/24155 |

(Continued)

FOREIGN PATENT DOCUMENTS

| WO | 2018017546 A1 | 1/2018 | |
| WO | WO-2019202073 A1 * | 10/2019 | G06K 9/6215 |

OTHER PUBLICATIONS

Bragman et al., "Stochastic Filter Groups for Multi-Task CNNs: Learning Specialist and Generalist Convolution Kernels" Aug. 26, 2019, arXiv: 1908.09597v1, pp. 1-26. (Year: 2019).*

(Continued)

*Primary Examiner* — Vincent Gonzales
*Assistant Examiner* — Chase P. Hinckley
(74) *Attorney, Agent, or Firm* — Polsinelli LLP

(57) ABSTRACT

Various aspects provide methods for learning, such as continual learning, that support task-incremental learning using a multi-head classification architecture. Various aspects may enable conditional computing to support multi-head classification. Various aspects provide methods for learning, such as continual learning, that support class-incremental learning using a single-head classification architecture. Various aspects may enable conditional computing to support single-head classification by predicting the task associated with a given test input and selecting an associated classification head based at least in part on the task prediction.

30 Claims, 14 Drawing Sheets

(51) Int. Cl.
| | |
|---|---|
| *G06N 3/0464* | (2023.01) |
| *G06N 3/048* | (2023.01) |
| *G06N 3/0495* | (2023.01) |
| *G06N 3/08* | (2023.01) |
| *G06N 20/10* | (2019.01) |
| *G06F 18/20* | (2023.01) |
| *G06N 3/063* | (2023.01) |

(52) U.S. Cl.
CPC ............. *G06N 3/0495* (2023.01); *G06N 3/08* (2013.01); *G06N 20/10* (2019.01); *G06F 18/285* (2023.01); *G06N 3/063* (2013.01)

(56) References Cited

U.S. PATENT DOCUMENTS

| | | | | |
|---|---|---|---|---|
| 2018/0181857 | A1* | 6/2018 | Mathew | G06N 3/084 |
| 2018/0261214 | A1* | 9/2018 | Gehring | G06N 3/04 |
| 2018/0341776 | A1* | 11/2018 | Wang | G06V 10/776 |
| 2019/0034798 | A1* | 1/2019 | Yu | G06N 3/045 |
| 2019/0073560 | A1* | 3/2019 | Matei | G06N 3/08 |
| 2019/0354567 | A1* | 11/2019 | Dehghani | G06N 3/04 |
| 2019/0354868 | A1* | 11/2019 | Wierstra | G06N 3/04 |
| 2020/0104699 | A1* | 4/2020 | Zhou | G06N 3/04 |
| 2020/0175362 | A1* | 6/2020 | Zhang | G06N 3/04 |
| 2020/0193279 | A1* | 6/2020 | Hostetler | G06F 1/3287 |
| 2020/0193296 | A1* | 6/2020 | Dixit | G06N 3/045 |
| 2020/0250483 | A1* | 8/2020 | Masse | G06N 3/047 |
| 2020/0293870 | A1* | 9/2020 | Isikdogan | G06V 10/70 |
| 2020/0302339 | A1* | 9/2020 | Nadamuni Raghavan | G06F 3/0659 |
| 2020/0334520 | A1* | 10/2020 | Chen | G06F 40/216 |
| 2020/0364573 | A1* | 11/2020 | Ramachandran | G06N 3/063 |
| 2020/0372361 | A1* | 11/2020 | Ehteshami Bejnordi | G06N 3/063 |
| 2020/0387762 | A1* | 12/2020 | Huang | G06V 10/96 |
| 2021/0012203 | A1* | 1/2021 | Vishnu | G06N 3/084 |
| 2021/0019632 | A1* | 1/2021 | Rostami | G06N 3/063 |
| 2021/0064989 | A1* | 3/2021 | Shaker | G06N 3/08 |
| 2021/0073643 | A1* | 3/2021 | Partovi Nia | G06N 3/04 |
| 2021/0117786 | A1* | 4/2021 | Schwarz | G06N 3/084 |
| 2022/0004849 | A1* | 1/2022 | Chen | G06T 5/70 |
| 2022/0129740 | A1* | 4/2022 | Yang | G06N 3/063 |
| 2022/0138525 | A1* | 5/2022 | Li | G06F 12/06 706/30 |
| 2022/0366218 | A1* | 11/2022 | Parisotto | G06N 3/048 |
| 2022/0383112 | A1* | 12/2022 | Tagliasacchi | G06N 3/048 |

OTHER PUBLICATIONS

Hua et al., "Channel Gating Neural Networks" Oct. 28, 2019, arXiv: 1805.12549v2, pp. 1-11. (Year: 2019).*
Hua et al., "Boosting the Performance of CNN Accelerators with Dynamic Fine-Grained Channel Gating" Oct. 2019, pp. 139-150. (Year: 2019).*
Berriel et al., "Budget-Aware Adapters for Multi-Domain Learning" Aug. 13, 2019, arXiv: 1905.06242v2, pp. 1-12. (Year: 2019).*
You et al., "Gate Decorator: Global Filter Pruning Method for Accelerating Deep Convolutional Neural Networks" Sep. 18, 2019, arXiv: 1909.08174v1, pp. 1-15. (Year: 2019).*
Scheidegger et al., "Seperable Convolutional Eigen-Filters (SCEF): Building Efficient CNNs Using Redundancy Analysis" Oct. 21, 2019, arXiv: 1910.09359v1, pp. 1-10. (Year: 2019).*
Munkhdalai et al., "Rapid Adaptation with Conditionally Shifted Neurons" Jul. 3, 2018, arXiv: 1712.09926v3, pp. 1-12. (Year: 2018).*
Chaudhry et al., "On Tiny Episodic Memories in Continual Learning" Jun. 4, 2019, arXiv: 1902.10486v4, pp. 1-7. (Year: 2019).*
Singh et al., "Play and Prune: Adaptive Filter Pruning for Deep Model Compression" May 11, 2019, arXiv: 1905.04446v1, pp. 1-7. (Year: 2019).*
Hung et al., "Compacting, Picking and Growing for Unforgetting Continual Learning" Oct. 30, 2019, arXiv: 1910.06562v3, pp. 1-12. (Year: 2019).*
Xu et al., "Formality Style Transfer with Hybrid Textual Annotations" Mar. 15, 2019, arXiv: 1903.06353v1, pp. 1-9. (Year: 2019).*
Li et al., "Learning without Forgetting" Feb. 14, 2017, arXiv: 1606.09282v3, pp. 1-13. (Year: 2017).*
Li et al., "Learn to Grow: A Continual Structure Learning Framework for Overcoming Catastrophic Forgetting" May 21, 2019, arXiv: 1904.00310v3, pp. 1-12. (Year: 2019).*
Zhong et al., "Boosting Network: Learn by Growing Filters and Layers via SplitLBI" 2019, OpenReview, pp. 1-10. (Year: 2019).*
Requeima et al., "Fast and Flexible Multi-Task Classification using Conditional Neural Adaptive Processes" Jun. 18, 2019, arXiv: 1906.07697v1, pp. 1-23. (Year: 2019).*
Shomron et al., "Thanks for Nothing: Predicting Zero-Valued Activations with Lightweight Convolutional Neural Networks" Sep. 17, 2019, pp. 1-10. (Year: 2019).*
Ding et al., "Approximated Oracle Filter Pruning for Destructive CNN Width Optimization" May 12, 2019, arXiv: 1905.04748v1, pp. 1-11. (Year: 2019).*
Ebrahimi et al., "Uncertainty-guided Continual Learning with Bayesian Neural Networks" Jun. 6, 2019, arXiv: 1906.02425v1, pp. 1-14. (Year: 2019).*
Ahn et al., "Uncertainty-based Continual Learning with Adaptive Regularization" Oct. 27, 2019, arXiv: 1905.11614v2, pp. 1-21. (Year: 2019).*
Lange et al., "Continual Learning: A comparative study on how to defy forgetting in classification tasks" Sep. 18, 2019, arXiv: 1909.08383v1, pp. 1-23. (Year: 2019).*
Aljundi, Rahaf "Continual Learning in Neural Networks" Oct. 18, 2019, arXiv: 1910.02718v2, pp. 1-190. (Year: 2019).*
Van de Ven et al., "Generative replay with feedback connections as a general strategy for continual learning" Apr. 17, 2019, arXiv: 1809.10635v2, pp. 1-17. (Year: 2019).*
Tavanei et al., "Training Spiking ConvNets by STDP and Gradient Descent" 2018, pp. 1-8. (Year: 2018).*
Allred et Roy, "Stimulating STDP to Exploit Locality for Lifelong Learning without Catastrophic Forgetting" 2019, pp. 1-6. (Year: 2019).*
Wu et al., "ACE: Adapting to Changing Environments for Semantic Segmentation" Apr. 12, 2019, arXiv: 1904.06268v1, pp. 1-10. (Year: 2019).*
Hu et al., "Overcoming Catastrophic Forgetting for Continual Learning via Model Adaptation" May 2019, pp. 1-14. (Year: 2019).*
Bejnordi et al., "Batch-Shaped Channel Gated Networks" Jul. 15, 2019, arXiv: 1907.06627, pp. 1-10. (Year: 2019).*
Serra et al., "Overcoming Catastrophic Forgetting with Hard Attention to the Task" May 29, 2018, arXiv: 1801.01423v3, pp. 1-17. (Year: 2018).*
Masse et al., "Alleviating catastrophic forgetting using context-dependent gating and synaptic stabilization" Oct. 12, 2018, pp. 1-9. (Year: 2018).*
Masse et al., "Training artificial neural networks using context-dependent gating with weight stabilization" Feb. 1, 2019, U.S. Appl. No. 62/800,167, pp. 1-74. (Year: 2019).*
Chen et al., "image processing neural networks with dynamic filter activation" Nov. 20, 2018, U.S. Appl. No. 62/770,120, pp. 1-25. (Year: 2018).*
Chen et al., "You Look Twice: GaterNet for Dynamic Filter Selection in CNNs" Apr. 1, 2019, arXiv: 1811.11205v2, pp. 1-10. (Year: 2019).*
Takikawa et al., "Gated-SCNN: Gated Shape CNNs for Semantic Segmentation" Jul. 12, 2019, arXiv: 1907.05740v1, pp. 1-10. (Year: 2019).*
Davide A., et al., "Conditional Channel Gated Networks for Task-Aware Continual Learning", 2020 IEEE/CVF Conference on Computer Vision and Pattern Recognition (CVPR), IEEE, Jun. 13, 2020 (Jun. 13, 2020), pp. 3930-3939, XP033804579, DOI: 10.1109/CVPR42600.2020.00399 [retrieved on Aug. 3, 2020] the whole document.
International Search Report and Written Opinion—PCT/US2020/060665—ISA/EPO—Mar. 21, 2021 17 pages.

(56) References Cited

OTHER PUBLICATIONS

Abel Z., et al., "Improving SeNA-CNN by Automating Task Recognition", Advances in Databases and Information Systems, [Lecture Notes in Computer Science, Lect.Notes Computer], Springer International Publishing, CHAM, Nov. 9, 2018 (Nov. 9, 2018), pp. 711-721, XP047493648, ISBN: 978-3-319-10403-4 [retrieved on Nov. 9, 2018] p. 712—p. 716 abstract.

Hung S.C.Y., et al., "Compacting, Picking and Growing for Unforgetting Continual Learning", arxiv.org, Cornell university library, 201 Olin Library Cornell University Ithaca, NY 14853, Oct. 15, 2019 (Oct. 15, 2019), XP081515706, p. 2-p. 3. (12 pages).

\* cited by examiner

CONDITIONAL COMPUTATION FOR CONTINUAL LEARNING

RELATED APPLICATIONS

This application claims the benefit of priority to U.S. Provisional Application No. 62/935,147, entitled "Conditional Computation For Continual Learning" filed Nov. 14, 2019, the entire contents of which are hereby incorporated herein by reference for all purposes.

BACKGROUND

Deep neural networks are used heavily on computing devices for a variety of tasks, including scene detection, facial recognition, image sorting and labeling. These networks use a multilayered architecture in which each layer receives input, performs a computation on the input, and generates output or "activation." The output or activation of a first layer of nodes becomes an input to a second layer of nodes, the activation of a second layer of nodes becomes an input to a third layer of nodes, and so on. As such, computations in a deep neural network are distributed over a population of processing nodes that make up a computational chain.

Generally, neural networks that have longer computational chains (or larger learning capacity) generate more accurate results. However, their longer computational chains may also increase processing times and the amount of a computing device's processing and energy resources that is used by the neural network when processing tasks on the computing device.

Convolutional neural networks are deep neural networks in which computation in a layer is structured as a convolution. The weighted sum for each output activation is computed based on a batch of inputs, and the same matrices of weights (called "filters") are applied to every output. These networks conventionally implement a fixed feedforward structure in which all the processing nodes that make up a computational chain are used to operate on a single task. Conventionally, every filter in each layer is used to process the task, regardless of the input or computational complexity of the task.

Continual learning (also called lifelong learning or incremental learning) is an area of transfer learning. Continual learning provides the ability to learn different tasks in a sequential manner. As conventional continual learning occurs in a sequential manner, after a first task is learned, the data from that first task is not available for the next task. When training neural networks on a sequence of tasks, catastrophic forgetting can occur, meaning the network renounces past knowledge in order to readily fit the current objective of the current task.

Conditional computation research focuses on deep neural networks that can determine the computational graph at run time, conditioned on the provided input. Conditional computation strategies enable the disentanglement between capacity and inference time, allowing for extremely large yet efficient models.

SUMMARY

Various aspects of the disclosure provide frameworks for continual learning based on conditional computing benchmarks. Various aspects include methods for continual learning that support task-incremental learning using a multi-head classification architecture. Various aspects may enable conditional computing to support multi-head classification. Various aspects include methods for continual learning that support class-incremental learning using a single-head classification architecture. Various aspects may enable conditional computing to support single-head classification by predicting the task associated with a given test input and selecting an associated classification head based at least in part on the task prediction. Various aspects may apply binary masks (e.g., gating) in a neural network based at least in part on a current input to the network. Various aspects may apply binary masks (e.g., gating) to predict a task label for a task by a task classifier when task labels are not made available for tasks at test time of the neural network.

Various aspects include methods for learning, such as continual learning, in a neural network including receiving input in a layer in the neural network, the layer including a plurality of filters, determining a first series of filters of the plurality of filters to apply to the received input based on the received input and a first task, and applying the first series of filters to the received input to generate an activation for the first task.

Various aspects may further include determining a first set of important filters of the first series of filters upon completion of the first task, and fixing weight parameters of the first set of important filters such that the weight parameters of the first set of important filters cannot be updated during performance of tasks other than the first task. Some aspects may further include re-initializing weight parameters of all filters of the plurality of filters not included in the first set of important filters before performing a next task. In some aspects, determining the first series of filters of the plurality of filters to apply to the received input based on the received input and the first task, determining the first set of important filters of the first series of filters upon completion of the first task, and fixing weight parameters of the first set of important filters are performed by a first gating functionality component associated with the first task. In some aspects, determining the first set of important filters of the first series of filters upon completion of the first task may include determining the first set of important filters as filters of the first series of filters that have a firing probability at or above a probability threshold.

Various aspects may further include determining a second series of filters of the plurality of filters to apply to the received input based on the received input and a second task, applying the second series of filters to the received input to generate an activation for the second task, determining a second set of important filters of the second series of filters upon completion of the second task, wherein the second set of important filters does not include any of the first set of important filters, and fixing weight parameters of the second set of important filters such that the weight parameters of the second set of important filters cannot be updated during performance of tasks other than the second task. In some aspects, the second series of filters of the plurality of filters may include one or more filters of the first set of important filters having fixed weight parameters. In some aspects, determining the second series of filters of the plurality of filters to apply to the received input based on the received input and the second task, determining the second set of important filters of the second series of filters upon completion of the second task, and fixing weight parameters of the second set of important filters are performed by a second gating functionality component associated with the second task.

Various aspects may further include determining a number of remaining filters from the plurality of filters that have not been designated as important filters prior to performing a next task, determining a threshold for needed filters based at least in part on a number of remaining tasks to be performed prior to performing the next task, determining whether the number of remaining filters is below the determined threshold for needed filters prior to performing the next task, and prior to performing the next task, adding filters to the plurality of filters in response to determining that the number of remaining filters is below the determined threshold for needed filters.

In some aspects, the received input may be a training set, and receiving the training set in the layer in the neural network is part of training the neural network for at least the first task and the second task. In some aspects, determining the first series of filters of the plurality of filters may include determining the first series of filters of the plurality of filters at least in part according to a sparsity objective, and determining the second series of filters of the plurality of filters may include determining the second series of filters of the plurality of filters at least in part according to the sparsity objective.

In various aspects, a series of sequential tasks to be learned by the neural network may include at least the first task and the second task. Various aspects may include training a task classifier layer of the neural network to identify each of the series of sequential tasks based at least in part on outputs associated with previous tasks of the series of sequential tasks. In some aspects, the outputs associated with the previous tasks of the series of sequential tasks are stored outputs of actual prior performances of the previous tasks of the series of sequential tasks. In some aspects, the outputs associated with the previous tasks of the series of sequential tasks are generated modeled outputs of the previous tasks of the series of sequential tasks generated at a time of training the current task.

Various aspects may further include receiving a test input in the layer, generating activations in the layer for each of the series of sequential tasks using the test input, and determining by the task classifier layer a task of the series of sequential tasks to be tested by the test input based on the generated activations for each of the series of sequential tasks from the layer.

Various aspects may further include generating activations in the layer for the determined task to be tested using the test input to generate a test output, and sending the test output to a classification head associated with the determined task to be tested. In some aspects, the layer may be a convolution layer.

Further aspects include a computing device including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1A:
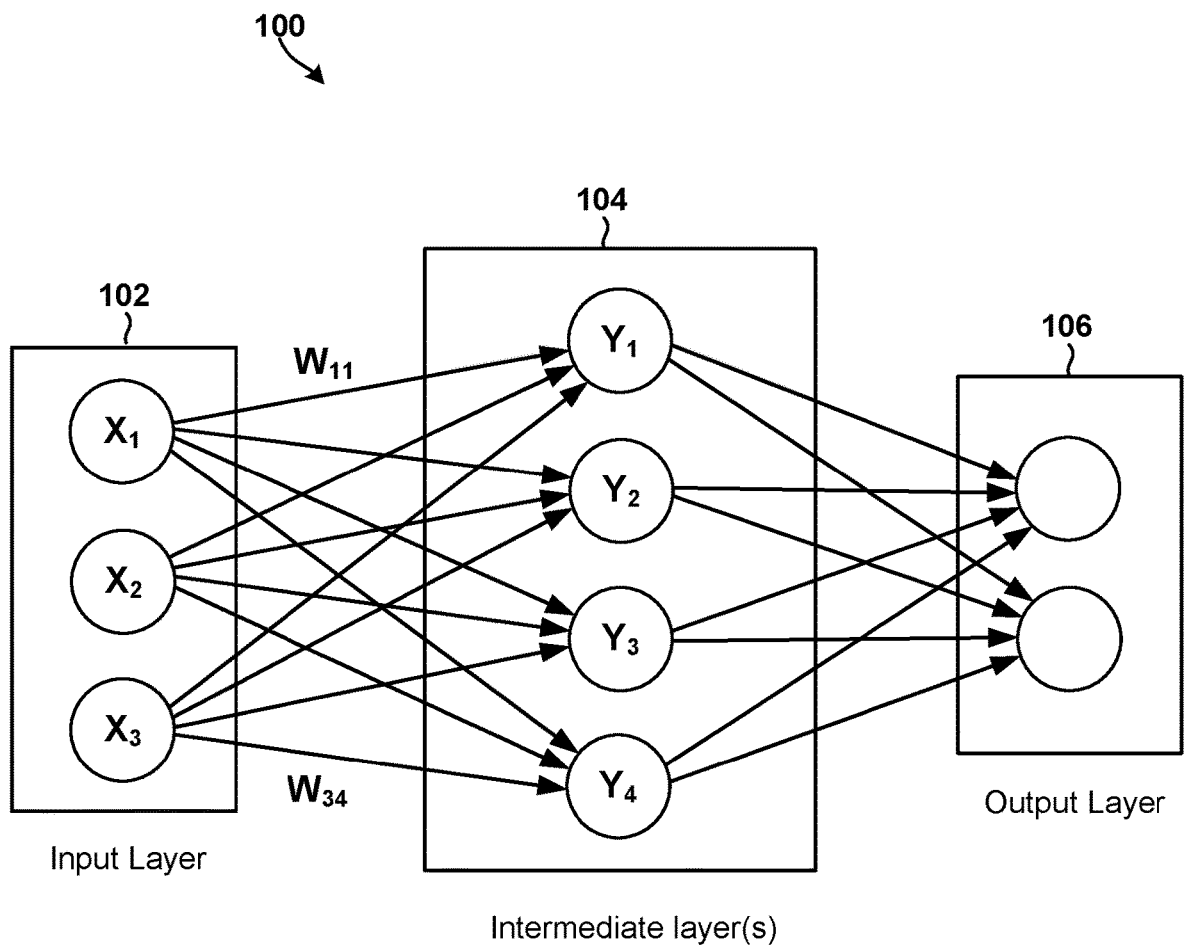
FIGS. 1A and 1B are functionality component block diagrams illustrating an example software implemented neural network that could benefit from implementing the embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods for learning, such as continual learning, that support task-incremental learning using a multi-head classification architecture. Various embodiments may enable conditional computing to support multi-head classification. Various embodiments provide methods for learning, such as continual learning, that support class-incremental learning using a single-head classification architecture. Various embodiments may enable conditional computing to support single-head classification by predicting the task associated with a given test input and selecting an associated classification head based at least in part on the task prediction. Various embodiments may improve the performance and efficiency of a neural network and the computing devices on which it is deployed. In the single-head setting, a significantly higher accuracy compared to conventional methods may be achieved by the various embodiments. Various embodiments may effectively prevent any forgetting in performances over past tasks in a task-incremental setting. Various embodiments may obviate the need for a task oracle during inference and to enable class-incremental learning by training a task classifier that performs feature and head selection.

The term "computing device" is used herein to refer to any one or all of servers, personal computers, mobile device, cellular telephones, smartphones, portable computing devices, personal or mobile multi-media players, personal data assistants (PDA's), laptop computers, tablet computers, smartbooks, IoT devices, palm-top computers, wireless electronic mail receivers, multimedia Internet enabled cellular telephones, connected vehicles, wireless gaming controllers, and similar electronic devices that include a memory and a programmable processor.

The term "neural network" is used herein to refer to an interconnected group of processing nodes (e.g., neuron models, etc.) that collectively operate as a software application or process that controls a function of a computing device or generates a neural network inference. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and activation. The weight values may be determined during a training phase and iteratively updated as data flows through the neural network.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input and final layer may be referred to as intermediate layers, hidden layers, or black-box layers.

Each layer in a neural network may have multiple inputs, and thus multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer as well as multiple preceding layers.

The term "batch normalization" or "BN" is used herein to refer to a process for normalizing the inputs of the layers in a neural network to reduce or eliminate challenges associated with internal covariate shift, etc.

The term "quantization" is used herein to refer to techniques for mapping input values of a first level of precision (e.g., first number of bits) to output values in a second, lower level of precision (e.g., smaller number of bits). Quantization is frequently used to improve the performance and efficiency of a neural network and the computing devices on which it is deployed.

Various embodiments provide efficient algorithms that may be implemented in circuitry, in software, and in combinations of circuitry and software without requiring a complete understanding or rigorous mathematical models. The embodiment algorithms may be premised upon a general mathematical model of the linear and nonlinear interferences, some of the details of which are described below. These equations are not necessarily directly solvable, and provide a model for structures that perform operations for improved neural network performance according to various embodiments.

A hurdle to the development of Artificial General Intelligence includes the need for machines that keep learning from their own experience, continuously updating their knowledge without forgetting already acquired concepts. Deep learning models can suffer from catastrophic forgetting as the neural network discards acquired knowledge (e.g., previous weighting values used in a prior task) to fit the current observations (e.g., by replacing the weighting values with values determined for a current task). The reason behind this behavior is that neural network updates on the current task seamlessly overwriting parameters that are critical for prior tasks.

Continual learning deep learning models attempt to address the catastrophic forgetting issue. Many strategies have emerged in continual learning for conventional neural networks, such as relying on memory buffers of stored examples, knowledge distillation, weight regularization, and parameters masking. The conventional strategies can aid in learning several tasks sequentially, but these conventional strategies rely on task-specific classifiers and are therefore limited to applications for which the knowledge of the task is available at test time. Such a test setting in which the task is indicated to the neural network at test time when a test input is received may be referred to as a multi-head classification architecture (or multi-head architecture or multi-head learning). In contrast, a test setting in which the task is not indicated to the neural network at test time when a test input is received may be referred to as a single-head classification architecture (or single-head architecture or single-head learning). In single-head classification architectures, a single classifier may be employed to output classifications as classifications are identified in an input stream.

Continual learning research has led to the formalization of several benchmarks. However, different choices in the experimental protocol lead to a taxonomy of scenarios even for a single dataset. The most critical separation is between task-incremental and class-incremental setups. A task-incremental benchmark assumes that the task label is available at test time, and it is fed to the learner model along with the observation to be classified. In terms of model architecture, such a setting often resolves in a model with different classifiers (sharing a common feature extractor), each of which is specialized for a single task. Notably, the presence of the task label at test time easily allows querying the relevant classification head (e.g., a multi-head architecture). On the contrary, class-incremental benchmarks refer to the classification of samples from an unknown task at test time. As such, learner models carry with a single classifier, whose output space expands at each task during training, as new classes are observed (e.g., a single-head architecture).

Conditional computation may leverage binary gating modules (or binary masks) to determine whether a computational block has to be executed or may be skipped at a given time. Such a decision may impact a neural network at different levels of granularity, by skipping entire residual blocks or certain units in a given layer.

Various embodiments may enable the selection of units (also referred to herein as "kernels" or "functions") in a neural network conditioned on a given input. In this manner, various embodiments may provide data-dependent channel-gating to support learning, such as continual learning.

Various embodiments may provide a conditional-computation-based approach to tackle both task-incremental and class-incremental learning problems. In both task-incremental and class-incremental learning, various embodiments may employ a different classification head for each task in a multi-head architecture. Various embodiments may employ channel-gating in the shared layers of the learner network (e.g., the neural network). Specifically, various embodiments employ task-dedicated local gating modules that dynamically select units (also referred to herein as kernels or functions) in a shared layer conditioned on the input feature map. This task-dedicated local gating, along with a sparsity objective, may encourage the use of fewer units, enabling per-sample model selection and may be easily exploited for obtaining information about which weights are essential (or relevant or important) for a given task and which ones are not. In various embodiments, relevant (or important or essential) units may be frozen, and the units that do not contribute to the performance of prior tasks may be made available for learning new tasks. In various embodiments, the gating modules for new tasks may dynamically select to either use or discard (without updating them) previously learned filters (e.g., filters previously used during training of a previous task and having their respective weights updated during the training of that previous task). Various embodiments may effectively prevent any forgetting in performances over past tasks in a task-incremental setting.

Various embodiments may obviate the need for a task oracle during inference and to enable class-incremental learning by training a task classifier that performs feature and head selection. In various embodiments, the task classifier may be trained along with the training of classification heads under incremental learning constraints. In some embodiments, a finite-capacity memory buffer (e.g., an episodic memory) may hold examples from prior tasks and those past examples may be used to train the task classifier. As one example, an incremental classifier and representation learning (iCaRL) model may be used to compute class prototypes as the mean feature representation of the stored memory and classify the test examples in a nearest-neighbor fashion. Other examples may include using models that intervene in the training algorithm to exploit the gradient of the current task and prior tasks from the memory to compute a smart update direction that guarantees non-destructive effects on the stored examples from the prior tasks in the memory. In some embodiments, a generative memory that does not rely on the replay of any real examples may be used to train the task classifier. A generative memory may generate fake examples of past tasks that may be efficiently sampled and used to train the task classifier. Various embodiments may make use of memory (e.g., episodic memory, generative memory, etc.) to replay examples (real or fake) for training the task classifier in task classification.

Various embodiments may provide a conditional computation solution to prevent forgetting in the multi-head setting by employing task-dedicated local gating modules that dynamically select units (also referred to herein as kernels or functions) in the current layer to apply to the input feature map using a sparsity objective encouraging the use of less than all available units per-sample model selection. In various embodiments, when a task ends, the behavior of the gating architecture may be exploited to isolate units that are important for a task (e.g., the ones that are frequently selected) from the ones that are not relevant (e.g., the ones that are never selected). In various embodiments, when training the neural network for the next task, the former important units are frozen (e.g., the weight parameters that were deemed important are held constant (or fixed)). In various embodiments, the frozen units may be reused, but the weight parameters may not be changed by other tasks. In this manner, the frozen units may be used for achieving high performance on the already learned task, whereas the unfrozen (e.g., the unimportant) units can be learned (e.g., trained and/or having their weight parameters adjusted) and modified without interfering with prior tasks. Various embodiments may also enable monitoring of how much capacity of the neural network is left to embed future tasks. The capacity determination may be used to trigger expansion of the neural network if further unfrozen units may be needed.

In various embodiments, in a single-head architecture for a neural network (e.g., where an indication of a task identity is not available at test time), a task classifier (e.g., a task classifier layer) may identify a task to be tested based on classification features relevant for every task. The neural network (e.g., convolution layers dedicated to performing tasks in the network) may compute features that may be used by every task-specific head, concatenate the computed features together, and feed the concatenated features to the task classifier. To prevent forgetting on the task classifier, various embodiments may rely on a replay of examples from past tasks. Those examples can either be stored in a limited memory buffer or generated by a generative model (pseudo-inputs). The computation cost of a neural network computing features for every task-specific head may not be high as in various embodiments, on a select number of units (also referred to herein as kernels or functions) may be used for each task as sparsity may be enforced by task specific gating. In this manner, despite the fact that various embodiments may run separate forward propagations for each of those task-specific features, the overall cost may be comparable to a single propagation in the whole network, as, for each task, only a small number of units are selected and computed.

Various embodiments provide solutions for multi-head continual learning in neural networks, based on gating modules that select which units (also referred to herein as kernels or functions) to apply at every layer. In various embodiments, the decision of whether to apply a unit or not may depend both on the given input and its task. Various embodiments may provide solutions for continual learning in single-head neural networks by equipping the network with an additional task classifier that is fed with a concatenation of gated features relevant for all tasks. Continual learning may be enabled on the task classifier by rehearsal on examples from prior tasks (such as either a limited number of real examples from an episodic model or an infinite number of generated examples from a generative model). Various embodiments may achieve state-of-the-art performances in the multi-head setting. For the single-head setting, upper bound performances obtained by replaying all examples from prior tasks to train the task classifier were computed. In the single-head setting, a significantly higher accuracy compared to conventional methods was achieved by the various embodiments.

Various types of parametric mappings are discussed herein, specifically with convolutional layers. The discussions of convolutional layers are provided merely as examples to better illustrate the aspects of the various embodiments, and are not intended to limit the various embodiments in any way. Other types of parametric mappings may be used with the various embodiments, and the other types of parametric mappings may be substituted in the various examples without departing from the scope of the claims. For instance, various embodiments may be applied to fully connected layers and/or residual blocks.

Figure 1B:
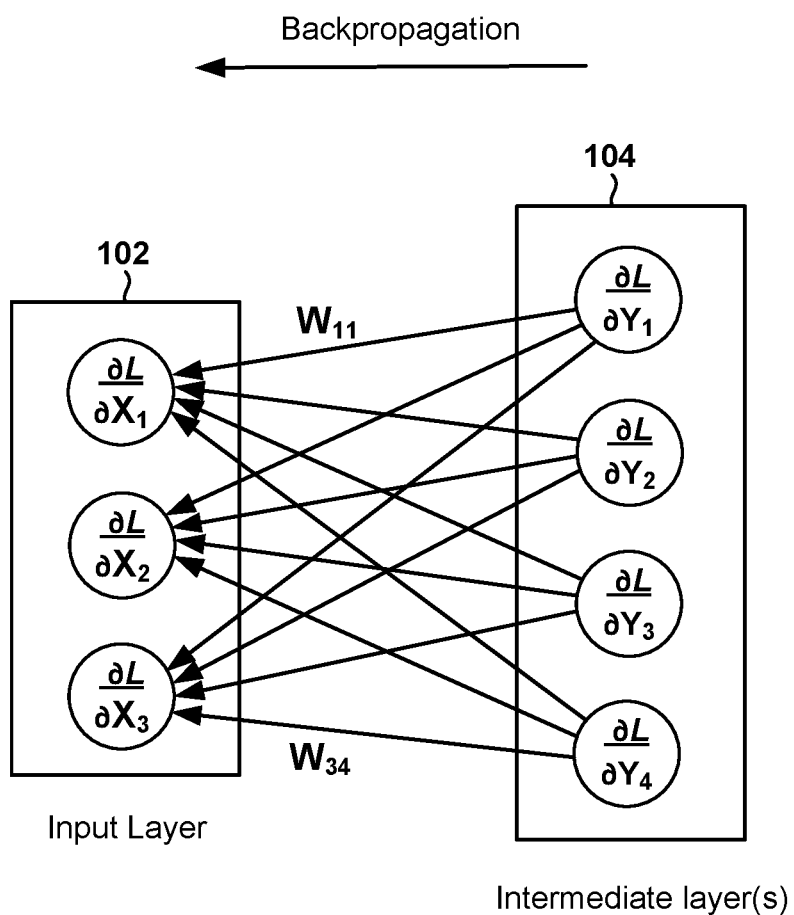

FIGS. 1A and 1B illustrate an example neural network 100 that could be implemented in a computing device, and which could benefit from implementing the embodiments. With reference to FIG. 1A, the neural network 100 may include an input layer 102, intermediate layer(s) 104, and an output layer 106. Each of the layers 102, 104, 106 may include one or more processing nodes that receive input values, perform computations based the input values, and propagate the result (activation) to the next layer.

In feed-forward neural networks, such as the neural network 100 illustrated in FIG. 1A, all of the computations are performed as a sequence of operations on the outputs of a previous layer. The final set of operations generate the output of the neural network, such as a probability that an image contains a specific item (e.g., dog, cat, etc.) or information indicating that a proposed action should be taken. The final output of the neural network may correspond to a task that the neural network 100 may be performing, such as determining whether an image contains a specific item (e.g., dog, cat, etc.). Many neural networks 100 are stateless. The output for an input is always the same irrespective of the sequence of inputs previously processed by the neural network 100.

The neural network 100 illustrated in FIG. 1A includes fully-connected (FC) layers, which are also sometimes referred to as multi-layer perceptrons (MLPs). In a fully-connected layer, all outputs are connected to all inputs. Each processing node's activation is computed as a weighted sum of all the inputs received from the previous layer.

An example computation performed by the processing nodes and/or neural network 100 may be:

$$y_i = f\left(\sum_{i=1}^{3} W_{ij} * x_i + b\right)$$

in which $W_{ij}$ are weights, $x_i$ is the input to the layer, $y_j$ is the output activation of the layer, $f(\bullet)$ is a non-linear function, and b is bias, which may vary with each node (e.g., $b_j$). As another example, the neural network 100 may be configured to receive pixels of an image (i.e., input values) in the first layer, and generate outputs indicating the presence of different low-level features (e.g., lines, edges, etc.) in the image. At a subsequent layer, these features may be combined to indicate the likely presence of higher-level features. For example, in training of a neural network for image recognition, lines may be combined into shapes, shapes may be combined into sets of shapes, etc., and at the output layer, the neural network 100 may generate a probability value that indicates whether a particular object is present in the image.

The neural network 100 may learn to perform new tasks over time. However, the overall structure of the neural network 100, and operations of the processing nodes, do not change as the neural network learns the task. Rather, learning is accomplished during a training process in which the values of the weights and bias of each layer are determined. After the training process is complete, the neural network 100 may begin "inference" to process a new task with the determined weights and bias.

Training the neural network 100 may include causing the neural network 100 to process a task for which an expected/desired output is known, and comparing the output generated by the neural network 100 to the expected/desired output. The difference between the expected/desired output and the output generated by the neural network 100 is referred to as loss (L).

During training, the weights ($w_{ij}$) may be updated using a hill-climbing optimization process called "gradient descent." This gradient indicates how the weights should change in order to reduce loss (L). A multiple of the gradient of the loss relative to each weight, which may be the partial derivative of the loss $$\left(\text{e.g., } \frac{\partial L}{\partial X1}, \frac{\partial L}{\partial X2}, \frac{\partial L}{\partial X3}\right)$$

with respect to the weight, could be used to update the weights.

An efficient way to compute the partial derivatives of the gradient is through a process called backpropagation, an example of which is illustrated in FIG. 1B. With reference to FIGS. 1A and 1B, backpropagation may operate by passing values backwards through the network to compute how the loss is affected by each weight. The backpropagation computations may be similar to the computations used when traversing the neural network 100 in the forward direction (i.e., during inference). To improve performance, the loss (L) from multiple sets of input data ("a batch") may be collected and used in a single pass of updating the weights. Many passes may be required to train the neural network 100 with weights suitable for use during inference (e.g., at runtime or during execution of a software application program).

Figure 2:
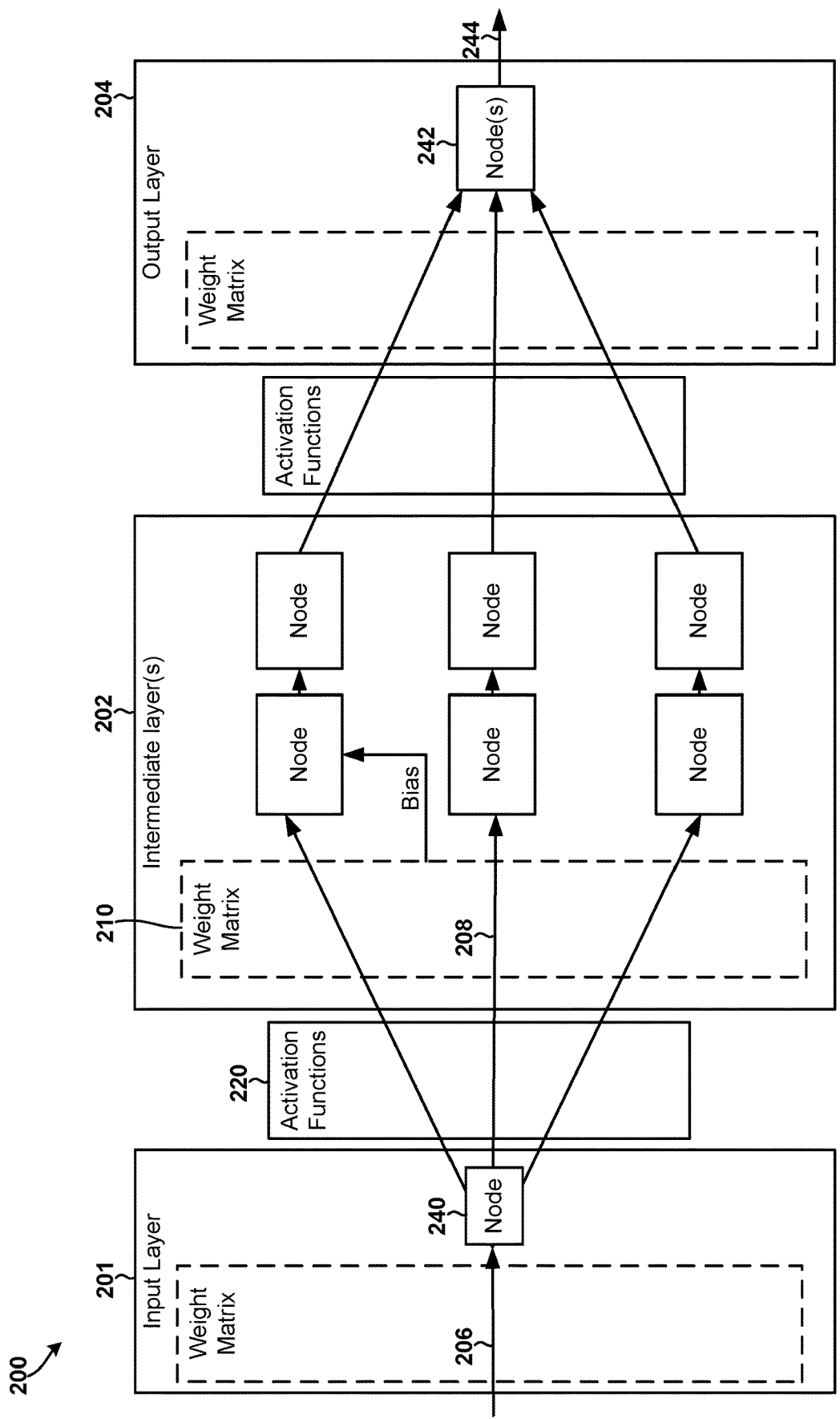
FIG. 2 is a functionality component block diagram illustrating interactions between functionality components in an example perceptron neural network that could benefit from implementing the embodiments.

FIG. 2 illustrates interactions between functionality components in another example neural network 200 that could be implemented in a computing device, and which could benefit from the implementation or use of the various embodiments. With reference to FIGS. 1A-2, in the example illustrated in FIG. 2, the neural network 200 is a multilayer perceptron neural network that includes an input layer 201, one or more intermediate layer 202, and an output layer 204. Each of the layers may include one or more nodes 240 that perform operations on the data. In between the layers, there may be various activation functions 220, such as a rectified linear unit (ReLU) that cuts off activations below zero. For ease of reference, and to focus the description on the important features, a layer and its activation functions 220 are sometimes referred to herein collectively as a "layer."

The input layer 201 may receive and process an input signal 206, generate an activation 208, and pass it to the intermediate layer(s) 202 as black-box inputs. The intermediate layer(s) inputs may multiply the incoming activation with a weight matrix 210 or may apply one or more weight factors and/or a bias to the black-box inputs.

The nodes in the intermediate layer(s) 202 may execute various functions on the inputs augmented with the weight factors and the bias. Intermediate signals may be passed to other nodes or layers within the intermediate layer(s) 202 to produce the intermediate layer(s) activations that are ultimately passed as inputs to the output layer 204. The output layer 204 may include a weighting matrix that further augments each of the received signals with one or more weight factors and bias. The output layer 204 may include a node 242 that operates on the inputs augmented with the weight factors to produce an estimated value 244 as output or neural network inference.

The neural networks 100, 200 described above include fully-connected layers in which all outputs are connected to all inputs, and each processing node's activation is a weighted sum of all the inputs received from the previous layer. In larger neural networks, this may require that the network perform complex computations. The complexity of these computations may be reduced by reducing the number of weights that contribute to the output activation, which may be accomplished by setting the values of select weights to zero. The complexity of these computations may also be reduced by using the same set of weights in the calculation of every output of every processing node in a layer. The repeated use of the same weight values is called "weight sharing." Systems that implement weight sharing store fewer weight parameters, which reduces the storage and processing requirements of the neural network and the computing device on which it is implemented.

Some neural networks may be configured to generate output activations based on convolution. By using convolution, the neural network layer may compute a weighted sum for each output activation using only a small "neighborhood" of inputs (e.g., by setting all other weights beyond the neighborhood to zero, etc.), and share the same set of weights (or filter) for every output. A set of weights is called a filter or kernel. A filter (or kernel) may also be a two- or three-dimensional matrix of weight parameters. In various embodiments, a computing device may implement a filter via a multidimensional array, map, table or any other information structure known in the art.

Generally, a convolutional neural network is a neural network that includes multiple convolution-based layers. The use of convolution in multiple layers allows the neural network to employ a very deep hierarchy of layers. As a result, convolutional neural networks often achieve significantly better performance than neural networks that do not employ convolution.

Figure 3A:
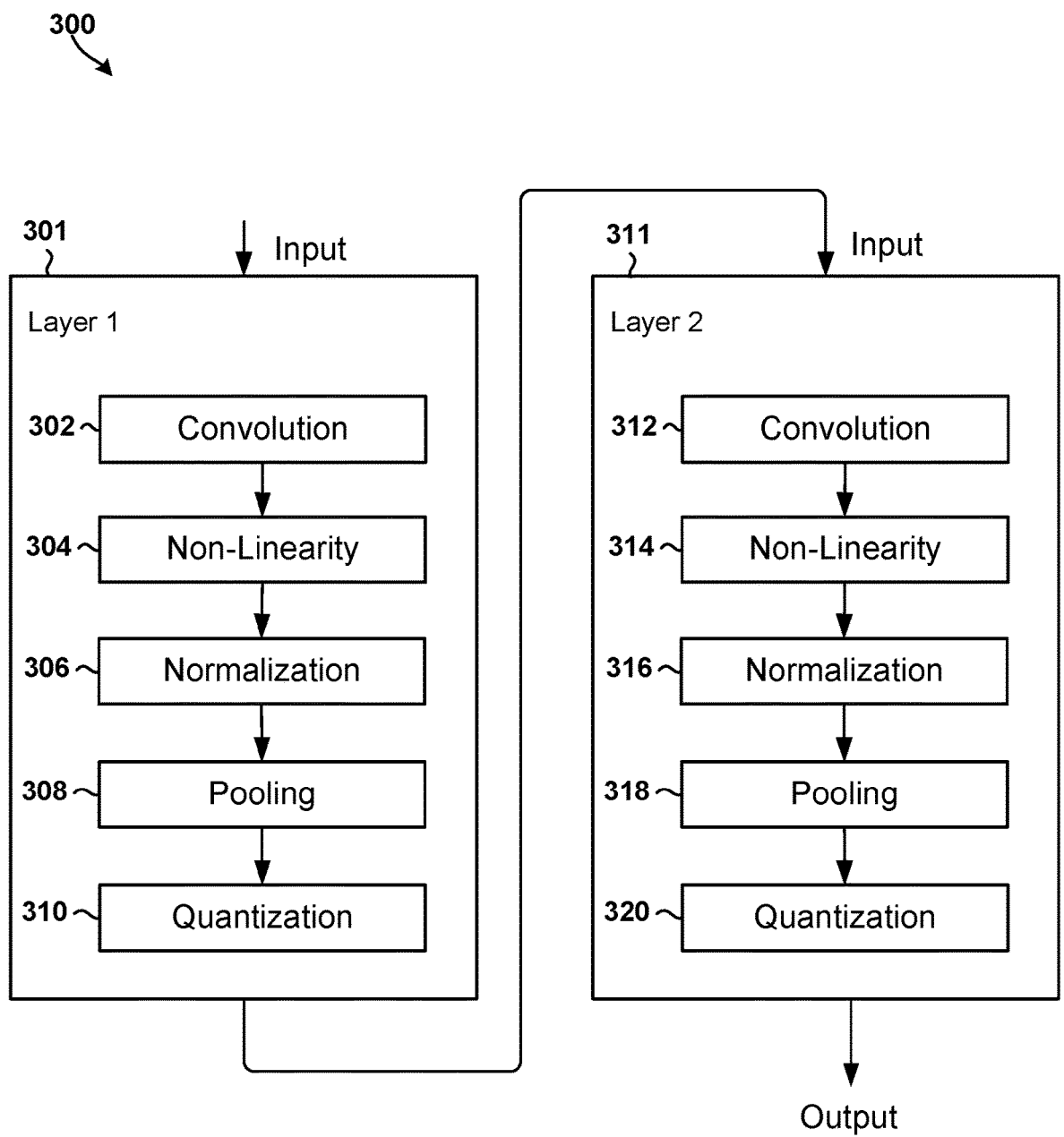
FIGS. 3A and 3B are functionality component block diagrams illustrating interactions between functionality components in an example convolutional neural network that could be configured to implement a generalized framework to accomplish continual learning in accordance with various embodiments.
Figure 3B:
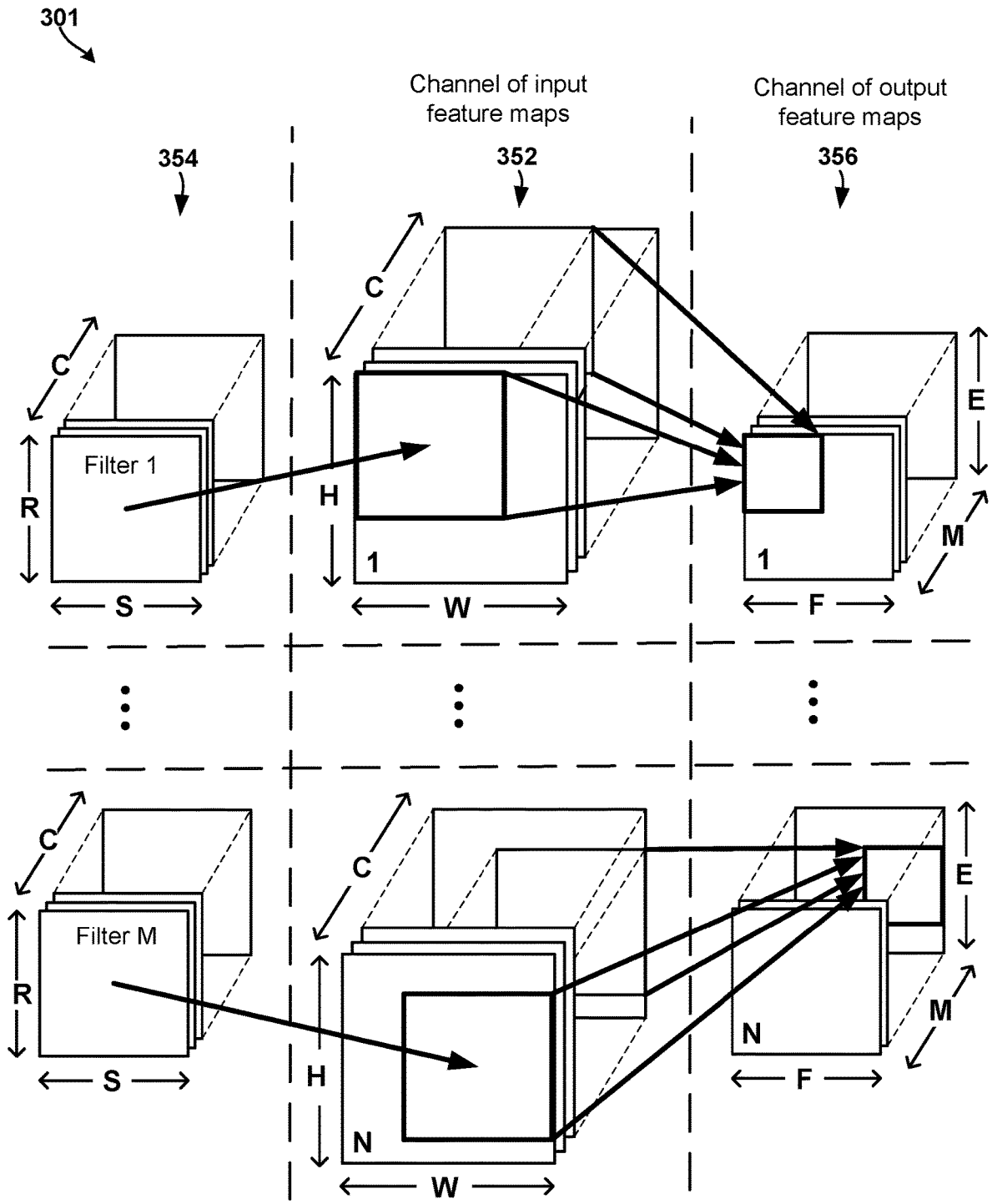

FIGS. 3A and 3B illustrate example functionality components that may be included in a convolutional neural network 300, which could be implemented in a computing device and configured to implement a generalized framework to accomplish continual learning in accordance with various embodiments.

With reference to FIGS. 1-3A, the convolutional neural network 300 may include a first layer 301 and a second layer 311. Each layer 301, 311 may include one or more activation functions. In the example illustrated in FIG. 3A, each layer 301, 311 includes convolution functionality component 302, 312, a non-linearity functionality component 304, 314, a normalization functionality component 306, 316, a pooling functionality component 308, 318, and a quantization functionality component 310, 320. It should be understood that, in various embodiments, the functionality components 302-310 or 312-320 may be implemented as part of a neural network layer, or outside the neural network layer. It should also be understood that the illustrated order of operations in FIG. 6A is merely an example and not intended to limit the various embodiments to any given operation order. In various embodiments, the order of the operations of functionality components 302-310 or 312-320 may change in any given layer. For example, normalization operations by the normalization functionality component 306, 316 may come after convolution by the convolution functionality component 302, 312 and before non-linearity operations by the non-linearity functionality component 304, 314.

The convolution functionality component 302, 312 may be an activation function for its respective layer 301, 311. The convolution functionality component 302, 312 may be configured to generate a matrix of output activations called a feature map. The feature maps generated in each successive layer 301, 311 typically include values that represent successively higher-level abstractions of input data (e.g., line, shape, object, etc.).

The non-linearity functionality component 304, 314 may be configured to introduce nonlinearity into the output activation of its layer 301, 311. In various embodiments, this may be accomplished via a sigmoid function, a hyperbolic tangent function, a rectified linear unit (ReLU), a leaky ReLU, a parametric ReLU, an exponential LU function, a maxout function, etc.

The normalization functionality component 306, 316 may be configured to control the input distribution across layers to speed up training and the improve accuracy of the outputs or activations. For example, the distribution of the inputs may be normalized to have a zero mean and a unit standard deviation. The normalization function may also use batch normalization (BN) techniques to further scale and shift the values for improved performance.

The pooling functionality components 308, 318 may be configured to reduce the dimensionality of a feature map generated by the convolution functionality component 302, 312 and/or otherwise allow the convolutional neural network 300 to resist small shifts and distortions in values.

The quantization functionality components 310, 320 may be configured to map one set of values having a first level of precision (e.g., first number of bits) to a second set of value having a second level of precision (e.g., a different number of bits). Quantization operations generally improve the performance of the neural network. Backpropagating the loss function during training in may improve the quantization operations and/or the neural network may forgo performing quantization operations without any loss in accuracy or performance of the neural network.

With reference to FIGS. 1A-3B, in some embodiments, the inputs to the first layer 301 may be structured as a set of three-dimensional input feature maps 352 that form a channel of input feature maps. In the example illustrated in FIG. 3B, the neural network has a batch size of N three-dimensional feature maps 352 with height H and width W each having C number of channels of input feature maps (illustrated as two-dimensional maps in C channels), and M three-dimensional filters 354 including C filters for each channel (also illustrated as two-dimensional filters for C channels). Applying the 1 to M filters 354 to the 1 to N three-dimensional feature maps 352 results in N output feature maps 356 that include M channels of width F and height E. As illustrated, each channel may be convolved with a three-dimensional filter 354. The results of these convolutions may be summed across all the channels to generate the output activations of the first layer 301 in the form of a channel of output feature maps 356. Additional three-dimensional filters may be applied to the input feature maps 352 to create additional output channels, and multiple input feature maps 352 may be processed together as a batch to improve weight sharing or the reuse of the filter weights. The results of the output channel (e.g., set of output feature maps 356) may be fed to the second layer 311 in the convolutional neural network 300 for further processing.

As discussed herein, the continual learning problem may be considered that of a parametric model (e.g., a neural network) called a backbone or learner network, which is exposed to a sequence of tasks to be learned, $T=\{T_1, \ldots, T_{n_T}\}$. Each task $T_i$ takes the form of a classification problem, $T_i=\{x_j, y_j\}_{j=1}^{n_i}$ where $x_j \in R^m$ and $y_j \in \{1, \ldots, C_i\}$. In the task-incremental setting (or a multi-head architecture), the problem may be to meet the following objective:

$$\max_\theta E_{t \sim T}[E_{(x,y) \sim T_t}[\log p(y|x,t)]],$$

where θ identifies the parameterization of the learner network, and x, y, and t are random variables associated with the observation, the label, and the task of each example, respectively. Such a maximization problem is subject to the continual learning constraints: as the model observes tasks sequentially, the outer expectation is troublesome to compute or approximating. Notably, this setting requires the assumption that the identity of the task each example belongs to is known at both training and test stages. Such information can be exploited in practice to isolate the relevant task head performing classification, preventing the competition between classes belonging to different tasks through the same softmax layer.

In a class-incremental setting (or a single-head architecture), the model is slightly different with the maximization being to meet the following objective:

$$\max_\theta E_{t \sim T}[E_{(x,y) \sim T_t}[\log p(y|x)]],$$

in the absence of task conditioning. The absence of task conditioning prevents any form of task-aware reasoning in the model. Indeed, this setup requires to merge all separate task-specific heads into a single classifier, in which classes from different tasks compete with each other. Single-head settings are known to be more challenging than multi-head scenarios, with many standard methods failing in simple benchmarks.

In order to deal with observations from unknown tasks, while retaining advantages of multi-head settings, various embodiments for single-head architectures may use the joint prediction of the task and the class of each example such that:

$$E_{t \sim T}[E_{(x,y) \sim T_t}[\log p(y,t|x)]] = E_{t \sim T}[E_{(x,y) \sim T_t}[\log p(y|x,t) + \log p(t|x)]].$$

The joint prediction embeds a twofold objective. On the one hand, the term log p(y|x, t) is responsible for the class classification given the task and resembles the multi-head objective. On the other hand, the term log p(t|x) aims at predicting the task from the observation. Such prediction relies on a task classifier, which is trained incrementally in a single-head fashion in various embodiments. The output of the task classifier may select which classification head to query for class prediction. Notably, the proposed objective shifts the single-head complexities from a class prediction to a task prediction level, with the following benefits: 1) given task label awareness, the drop in class prediction accuracy is zero; 2) classes from different tasks never compete with each other, neither during training nor during test; and 3) the challenging single-head prediction step acts on a task level rather than a class level, as tasks and classes form a two-level hierarchy, the prediction of the former is arguably easier (as it acts at a coarser semantic level).

Figure 4A:
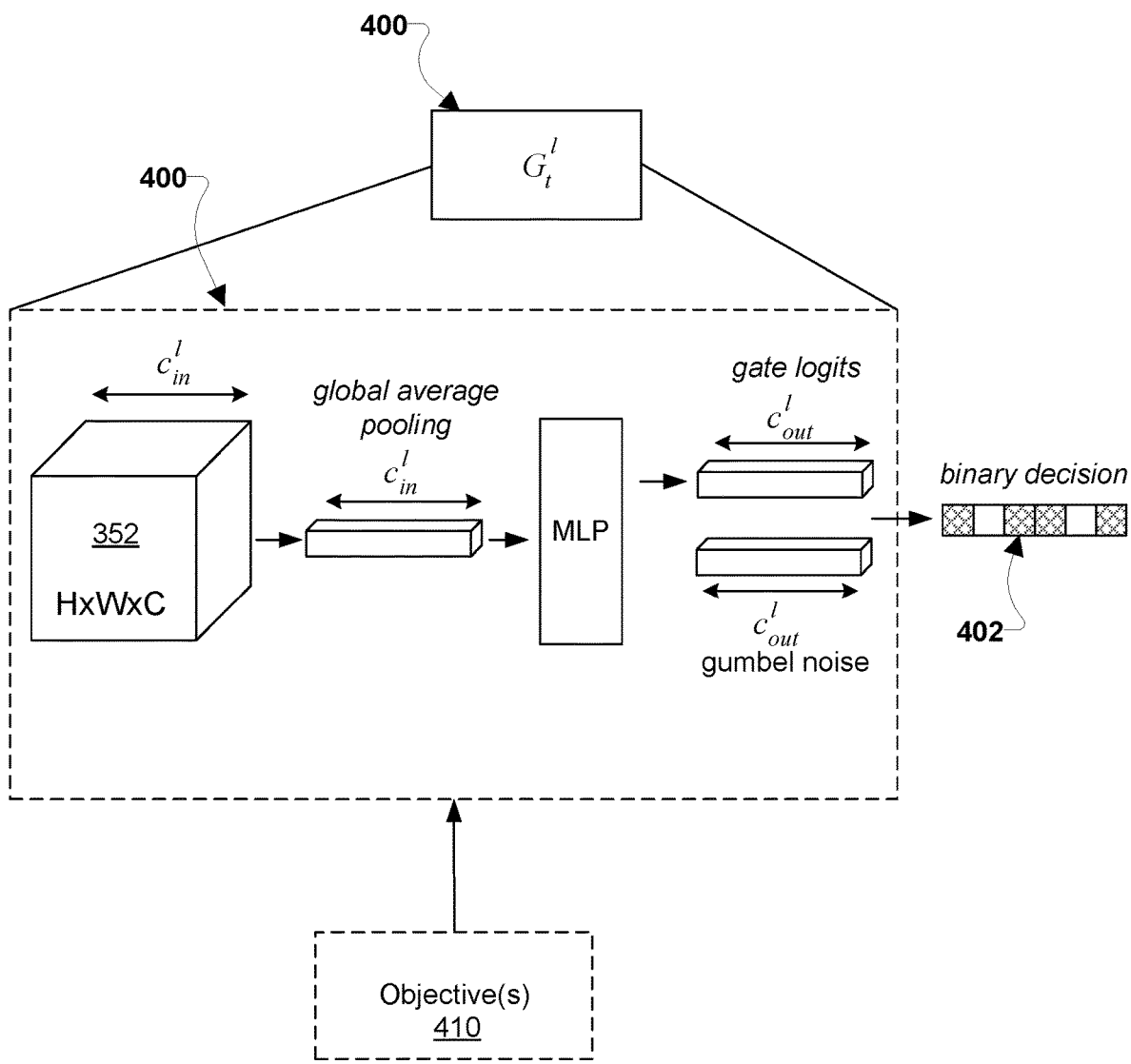
FIGS. 4A, 4B, and 4C are block diagrams illustrating functionality components and interactions in a system that implements a generalized framework for a gating functionality component for accomplishing learning in a neural network in accordance with various embodiments.
Figure 4B:
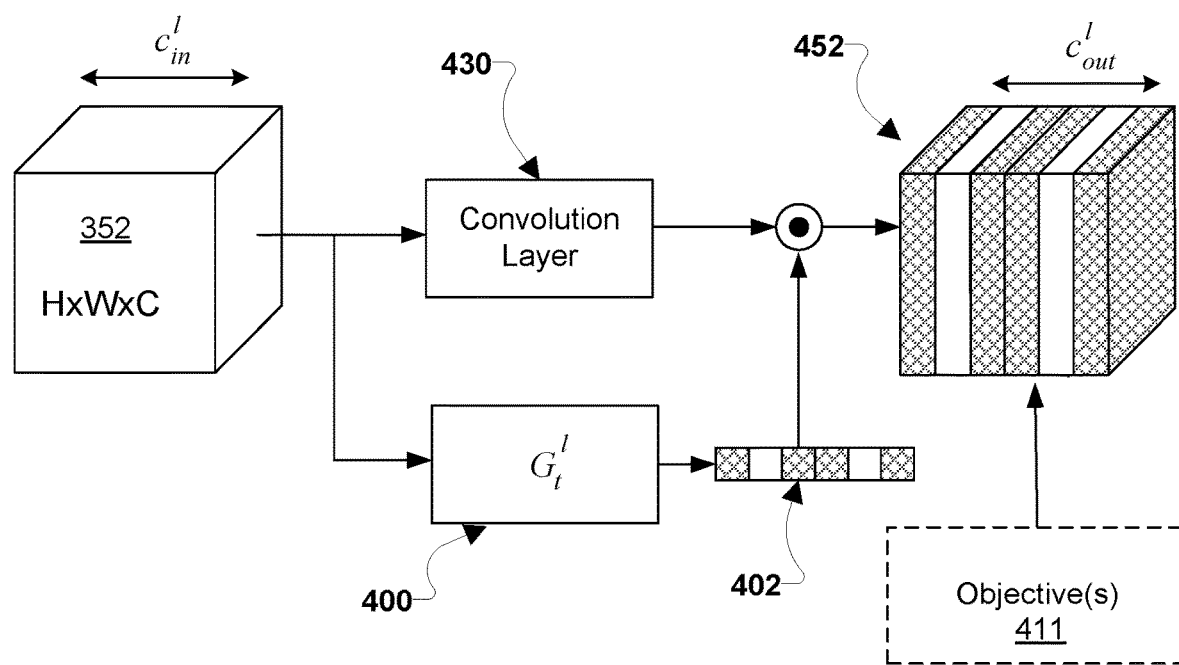
Figure 4C:
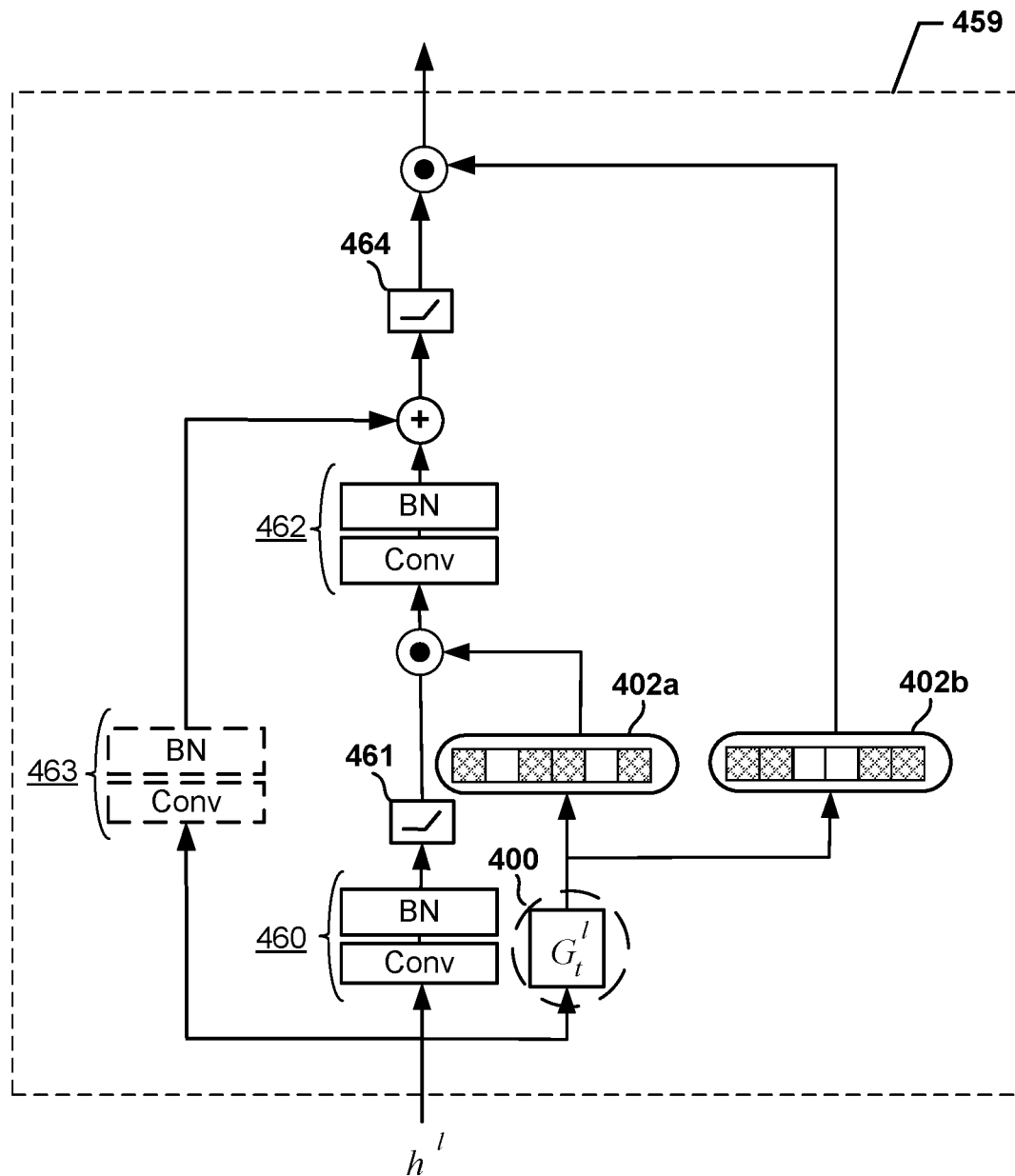

FIGS. 4A, 4B, and 4C are block diagrams illustrating functionality components and interactions in a system that implements a generalized framework for a gating functionality component 400 which could be implemented in a computing device and configured to implement learning, such as continual learning, using conditional computation in a neural network in accordance with various embodiments. The gating functionality component 400 may provide masking (or gating) to convolution layers in a neural network. Convolution layers are sometimes called weight layers. Weight layers should not be confused with weight parameters, which are values determined during training and included in filters that are applied to the input data to generate an output activation.

With reference to FIGS. 1-4A, FIG. 4A illustrates a gating scheme that may be implemented by a gating functionality component 400 in various embodiments. The gating functionality component 400 may receive as input a feature, such as channel of input feature maps 352. Additionally, the gating functionality component 400 may receive one or more objectives 410, such as a sparsity objective. In some embodiments, the sparsity objective may be associated with a difficulty of tasks to be performed by the neural network. The sparsity object may be selected to adapt the gating modules of the neural network to the difficulty of the tasks to be performed by the neural network. The gating functionality component 400 allows a neural network to identify or determine the filters 402, such as a channel of output feature maps 356 that are relevant to the received input, such as channel of input feature maps 352, and selectively activating or deactivate one or more filters 402 based on their relevance to the received input. This may significantly reduce the complexity of the computations performed in each layer of the neural network without negatively impacting the accuracy of the output activations.

In various embodiments, each gating functionality component 400 may include a pooling functionality component, such as a pooling functionality component 308, 318 of the convolutional neural network 300 illustrated in FIG. 3A. The results of pooling by the pooling functionality component, such as global average pooling, may be output to a layer, such as a multi-layer perceptron (MLP) with a single hidden layer having a number of units (also referred to herein as functions or kernels), such as 16 units. The MLP may be followed by a batch normalization layer, such as a normalization functionality component 306, 316, and an activation, such as a rectified linear unit (ReLU) activation. A final linear map provides log-probabilities for each output channel of the corresponding convolution. Sampling binary on/off decisions from such probabilities may be difficult, so Gumbel-Softmax sampling may be used to result in a biased estimate of the gradient utilizing the straight-through estimator. For example, a hard threshold in the forward pass (zero centered) may be used and the sigmoid function in the backward pass (with τ=2/3). The output of the gating functionality component 400 may be a 1×1×c matrix of binary decisions 402 of activated/deactivated filters.

An objective 410, such as the sparsity objective, may penalize the number of active convolutional kernels. For example, the sparsity objective may be:

$$L_{spars} = E_{(x,y) \sim T_t}\left[\frac{\lambda_s}{L} \sum_{l=1}^{L} \frac{\|G_t^l(h^l)\|_1}{c_{out}^l}\right],$$

where L is the total number of gated layers and $\lambda_s$ is set to control the level of sparsity. The sparsity objective instructs each gating functionality component 400 to select a minimal set of kernels (also called units or filters) and may enable the capacity of the neural network to be adapted based on the difficulty of the task and the observation at hand. Such a data-driven model selection of the various embodiments by the gating functionality component 400 differs from other continual learning strategies that employ fixed rations for model growing or weight pruning.

With reference to FIGS. 1-4B, FIG. 4B illustrates that the binary decision output 402 of the gating functionality component 400 may be channel-wise multiplied with the output from a convolution layer 430, such as a two-dimensional convolution layer Conv2D. The convolution layer 430 may convolve a series of filters, such as spatial filters, over the received input, such as channel of input feature maps 352, to produce a gated output 452, such as a channel of output feature maps 356, corresponding to activated filters.

In an embodiment computational method using the gating functionality component 400, the input feature map may be $h^l \in R^{c_{in}^l, h, w}$ and the output feature map may be $h^{l+1} \in R^{c_{out}^l, h', w'}$ of the l-th convolutional layer, respectively. Instead of $h^{l+1}$, the following layer may be forwarded a sparse feature map of $\hat{h}^{l+1}$, obtained by pruning uninformative channels by the gating functionality component 400. During the training of a task t, the binary decision 402 regarding which channels have to be activated/deactivated may be delegated to the gating functionality component 400, and is conditioned on the input feature map of $h^l$ such that $\hat{h}^{l+1} = G_t^l(h^l) \odot h^{l+1}$, where $$G_t^l(h^l) = \left[g_1^l, \ldots, g_{c_{out}^l}^l\right], g_i^l \in \{0, 1\} \forall i = 1, \ldots, c_{out}^l$$

and $\odot$ refers to channel wise multiplication. A new instance of the gating functionality component 400 may be instantiated each time an example of a new task is observed. Each of the gating functionality components 400 may be implemented as a light-network, so that the instantiation of a new gating functionality component 400 has negligible impact in terms of the number of parameters and computations. In various embodiments, objectives 411 may be feed to the convolution layers 430 and gating functionality component 400, such as a classification objective (e.g., the cross entropy of the classification). In this manner, objectives, such as objects 410 and/or 411 may be used to control the operations of gating functionality components 400.

With reference to FIGS. 1-4C, FIG. 4C illustrates a specific example of the gated convolution operations for multi-head learning using the gating functionality component 400. Specifically, FIG. 4C illustrates functionality to gate a residual neural network (ResNet) basic block 459, such as a ResNet-18 basic block. The input feature map $h^l$ may be passed to the gating functionality component 400. The gating functionality component 400 may compute independent gating vectors, such as two independent binary decisions 402*a* and 402*b*. The input feature map $h^l$ may be passed to a layer 460 of first convolution (Cony) and normalization (BN) functional components, such as a convolution functionality component 302, 312 and normalization functionality component 306, 316. The convolved and normalized feature map may be output to a non-linearity functionality component 461, such as non-linearity component 304, 314, that may output a feature map that may be channel wise multiplied with the first binary decision 402*a* output of the gating functionality component 400. That output may be the input feature map passed to another layer 462 of second convolution (Cony) and normalization (BN) functional components, such as a convolution functionality component 302, 312 and normalization functionality component 306, 316. The convolved and normalized feature map may be output to a non-linearity functionality component 464, such as non-linearity component 304, 314, that may output a feature map that may be channel wise multiplied with the second binary decision 402*b* output of the gating functionality component 400.

In an alternative embodiment, a shortcut may be employed to pass the input feature map $h^l$ to an alternative layer 463 of first convolution (Cony) and normalization (BN) functional components, such as a convolution functionality component 302, 312 and normalization functionality component 306, 316. The convolved and normalized feature map may be output to the non-linearity functionality component 464, such as non-linearity component 304, 314. In this manner, the double convolution of layers 460 and 462 may be skipped and replaced with just a single convolution of layer 463.

Figure 5:
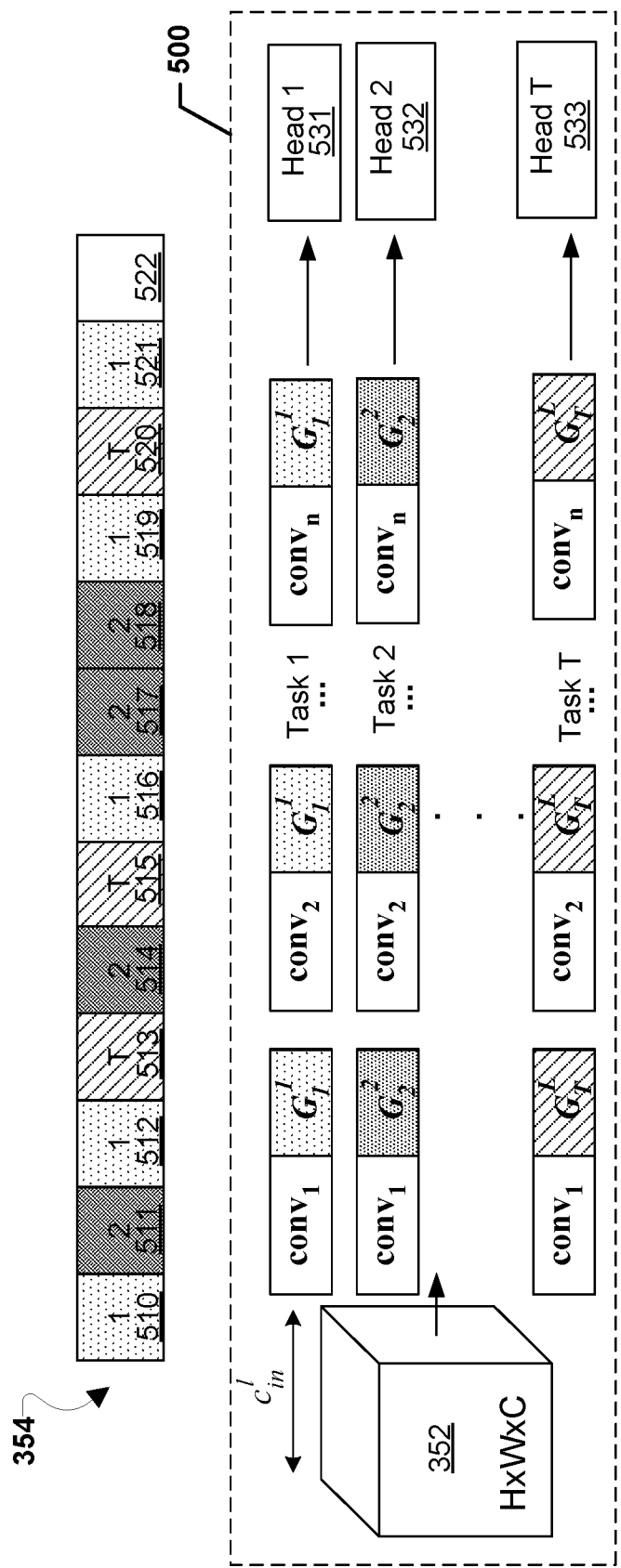
FIG. 5 is a functionality component block diagram illustrating interactions between functionality components in an example neural network to implement a generalized framework to accomplish learning in a multi-head architecture in accordance with various embodiments.

FIG. 5 is a functionality component block diagram illustrating interactions between functionality components in an example neural network 500 to implement a generalized framework to accomplish learning, such as continual learning, in a multi-head architecture in accordance with various embodiments. With reference to FIGS. 1-5, the neural network 500 may be a backbone network equipped with a set of gating functionality components 400. The gating functionality components 400 may be configured to apply one or more of a plurality of filters 354 to an input, such as a channel of input feature maps 352, to generate an activation for a task. Each gating functionality component 400 may be associated with its own one of a series of sequential tasks 1-T. Each task 1-T may be associated with its own respective classification head 1-T (e.g., heads 531, 532, 533, etc.).

In a training mode, the tasks 1-T may be performed sequentially. As each task 1-T is learned in training mode, one or more of the filters 354 (or units or kernels) may be used to generate the output to the respective classification heads 531, 532, 533 for each task. At the end of training of a task t (e.g., at the end of optimizing task t), the important filters of the plurality of filters 354 to that task t may be determined and the weight parameters of those important filters may be fixed such that the weight parameters of the important filters cannot be updated during performance of other task (e.g., tasks of than task t, such as task t+1, t+2, etc.).

As an example, at the end of training task t, a relevance score $r_i^l$ may be computed for each l-th layer by estimating the firing probability of their gates on a validation set $T_t^{val}$ where:

$$r_i^{l,t} = E_{(x,y) \sim T_t^{val}}[p(\pi[g_i^l = 1])],$$

where 527 [.] is an indicator function, and p(.) denotes a probability distribution. By thresholding such scores, two sets of kernels may be obtained. One the one hand, kernels that are relevant (or important) for the task t will be usable but not updateable by future tasks (e.g., their weight parameters may not be changed by future tasks). On the other hand, kernels that are non-relevant (or not important) for task t will be re-initialized and learnable (e.g., their weight parameters may be changed).

As a specific example, a gating functionality component 400 associated with a first task, Task 1, may determine a first series of the filters 354 to apply to the received input 352. After completion of the first task (e.g., after training of task 1), the gating functionality component 400 associated with the first task (task 1) may determine a first set of important filters of the first series of filters and may fix the weight parameters of the first set of important filters. For example, filters 510, 512, 516, 519, and 521 may be determined to be important filters associated with task 1, and the weight parameters of filters 510, 512, 516, 519, and 521 may be fixed. The weight parameters of the filters 511, 513, 514, 515, 517, 518, 520, and 522 not determined to be important to task 1 may be reinitialized and the next task, task 2 may be performed (e.g., task 2 may be learned).

A gating functionality component 400 associated with the second task, task 2, may determine a second series of the filters 354 to apply to the received input 352. The filters applied may include the important filters of task 1, filters 510, 512, 516, 519, and 521, but the weight parameters of those filters may not be adjusted during performance of task 2. After completion of the second task (e.g., after training of task 2), the gating functionality component 400 associated with the second task (task 2) may determine a second set of important filters of the second series of filters and may fix the weight parameters of the second set of important filters. For example, filters 511, 514, 517, and 518 may be determined to be important filters associated with task 2, and the weight parameters of filters 511, 514, 517, and 518 may be fixed. The weight parameters of the filters already determined to be important to task 1 (e.g., filters 510, 512, 516, 519, and 521) may not be adjusted. The weight parameters of filters 513, 515, 520, and 522 not determined to be important to task 1 or task 2 may be reinitialized and the next task, task may be performed (e.g., learned). Such sequential training and filter fixing may continue until all tasks t are learned. For example, the tasks through task T may be performed (e.g., learned), and filters 513, 515, and 520 may be determined to be important filters associated with task T, and the weight parameters of filters 513, 515, and 520 may be fixed. In such an example, filter 522 may not be determined to be important because filter 522 may not contribute to the performance of any tasks 1-T and the weight parameter of filter 522 may remain unfixed.

At testing time, the task of tasks 1-T to be performed on a test input may be indicated, such as by an oracle of the network 500, and the associated gating functionality component 400 for that selected task of the tasks 1-T may be used to apply the associated important filters of that selected task of the tasks 1-T to the test input and pass the output from the convolution layer to the appropriate classification head 531, 532, 533 associated with the selected task of the tasks 1-T.

Figure 6:
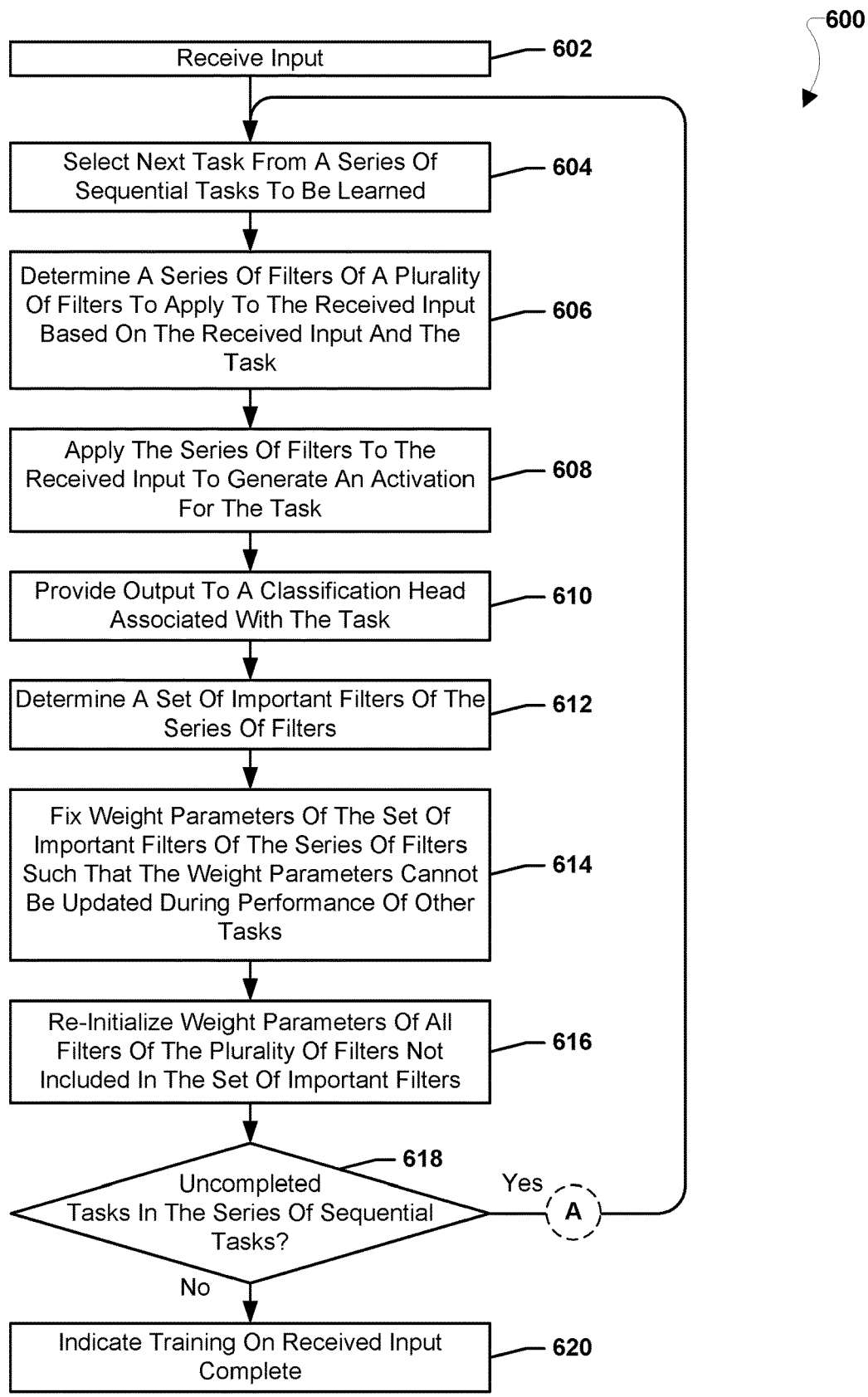
FIG. 6 is a process flow diagram illustrating a method of accomplishing learning in a neural network in accordance with various embodiments.
Figure 10:
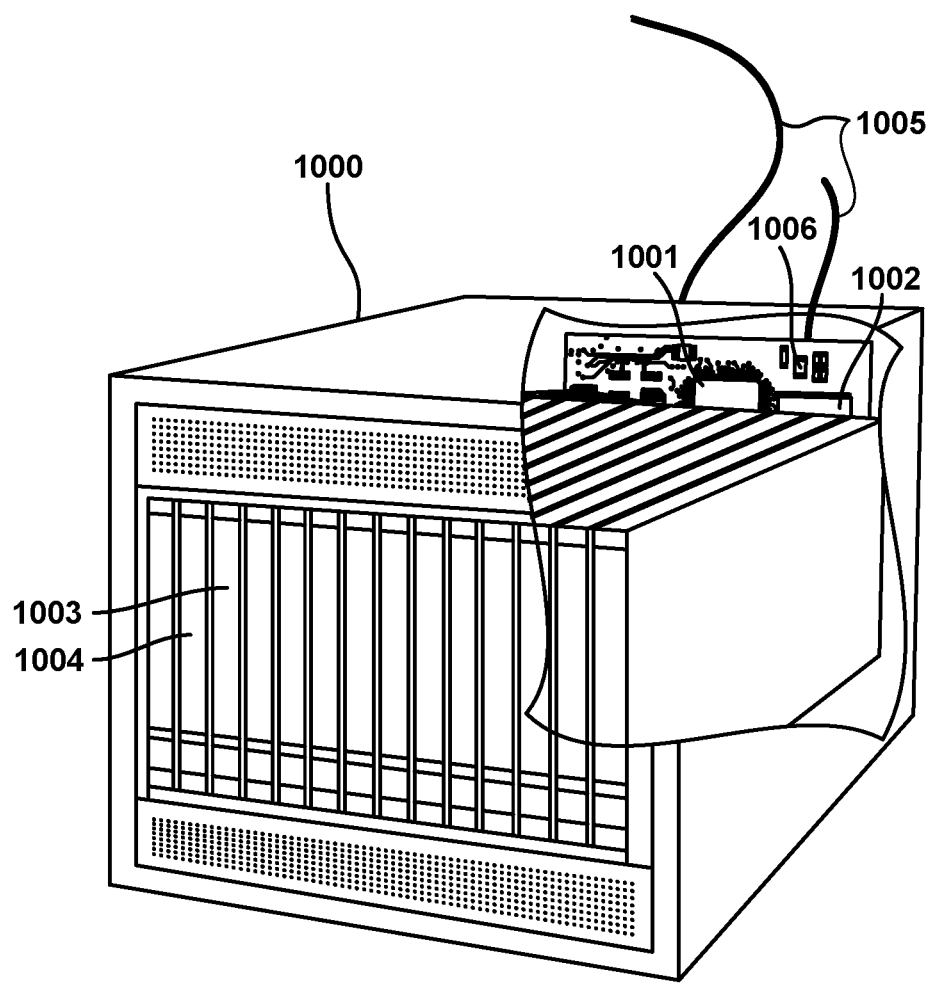
FIG. 10 is a component block diagram of server suitable for use with the various embodiments.

FIG. 6 illustrates a method 600 of accomplishing learning, such as continual learning, in a neural network in accordance with various embodiments. With reference to FIGS. 1A-6, method 600 may be performed by a processor in a computing system that implements all or portions of a neural network. Means for performing functions of each of the operations in the method 600 include a processor, such as processor 1001 (FIG. 10).

In block 602 the processor may receive an input. For example, an input may be received in a layer in the neural network. The layer may include a plurality of filters. For example, the input may be a training set, such as a channel of input feature maps 352.

In block 604, the processor may select a next task from a series of sequential tasks to be learned. The next task may be a next task that has not already been trained for the network.

In block 606, the processor may determine a series of filters of a plurality of filters to apply to the received input based on the received input and the task. For example, a gating functionality component 400 may determine one or more filters of a plurality of available filters (e.g., filters 354) to apply to the input (e.g., input 352) based on characteristics of the input and characteristics of the task to be performed.

In block 608, the processor may apply the series of filters to the received input to generate an activation for the task. The activation may be a gated output 452, such as a channel of output feature maps 356, corresponding to activated filters.

In block 610, the processor may provide the output to a classification head associated with the task. Classification heads may be one for one associated with tasks. In some embodiments, the task associated with an input may be indicated to the processor at test time. In some embodiments, the task associated with the input may not be indicated at test time and the processor may determine the task.

In block 612, the processor may determine a set of important filters of the series of filters. Important filters may be filters with a high probability of firing to achieve a task. For example, a firing probability for the filters of the series of filters may be computed and compared to a probability threshold. Filters with a computed firing probability at or above the probability threshold may be determined to be important filters, and filters with a computed firing probability below the probability threshold may be determined to be unimportant filters.

In block 614, the processor may fix weight parameters of the set of important filters of the series of filters such that the weight parameters cannot be updated during performance of other tasks.

In block 616, the processor may re-initialize weight parameters of all filters of the plurality of filters not included in the set of important filters. For example, non-important filters may be re-initialized to default starting weight parameters. In some embodiments, filters already designated as important to any other task may not be re-initialized.

In determination block 618, the processor may determine whether there are any uncompleted tasks in the series of sequential tasks. In response to determining there are uncompleted tasks (i.e., determination block 618="Yes"), the processor may select a next task from a series of sequential tasks to be learned in block 604. In response to determining there all tasks are complete (i.e., determination block 618="No"), the processor may indicate training on the received input is complete in block 620. As such, the neural network may move to a testing mode of operation and a test input may be received.

Figure 7:
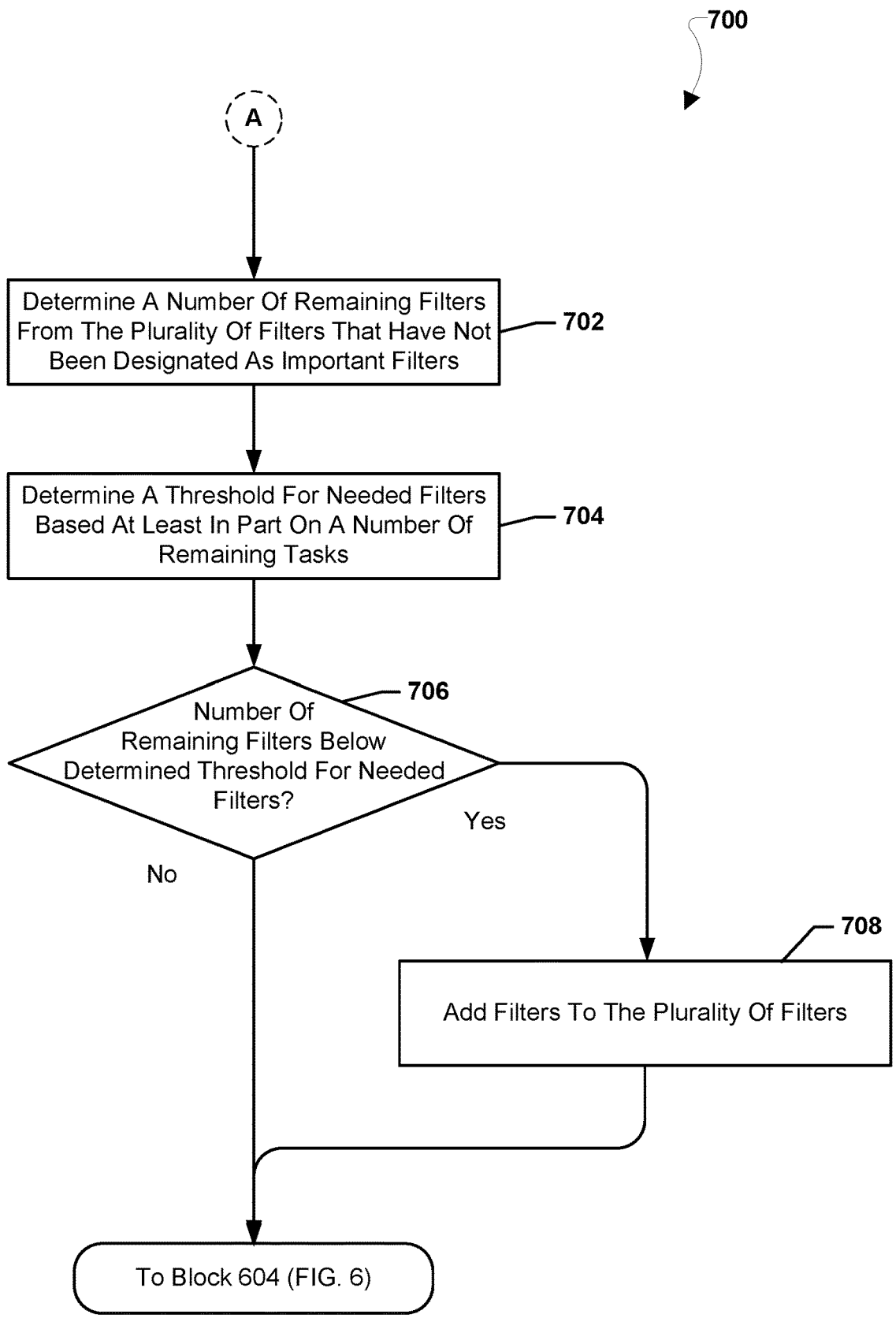
FIG. 7 is a process flow diagram illustrating a method of growing a neural network in accordance with various embodiments.

FIG. 7 illustrates a method 700 of growing a neural network in accordance with various embodiments. With reference to FIGS. 1A-7, method 700 may be performed by a processor in a computing system that implements all or portions of a neural network. Method 700 may be implemented in conjunction with method 600 (FIG. 6). For example, the operations of method 700 may be performed in response to determining there are uncompleted tasks (i.e., determination block 618=Yes) at the circle block "A" illustrated in FIG. 6. Means for performing functions of each of the operations in the method 700 include a processor, such as processor 1001 (FIG. 10).

In block 702, the processor may determine a number of remaining filters form the plurality of filters that have not been designated as important filters.

In block 704, the processor may determine a threshold for needed filters based at least in part on a number of remaining tasks.

In determination block 706, the processor may determine whether the number of remaining filters is below a determined threshold for needed filters. In response to determining the number is at or above the threshold (i.e., determination block 706="No"), the processor may select a next task from a series of sequential tasks to be learned in block 604.

In response to determining the number is below the threshold (i.e., determination block 706="Yes"), the processor may add filters to the plurality of filters in block 708. In this manner, at least a minimum number of filters may be available for each task to be trained. In block 604, the processor may select a next task from a series of sequential tasks to be learned in block 604.

Figure 8:
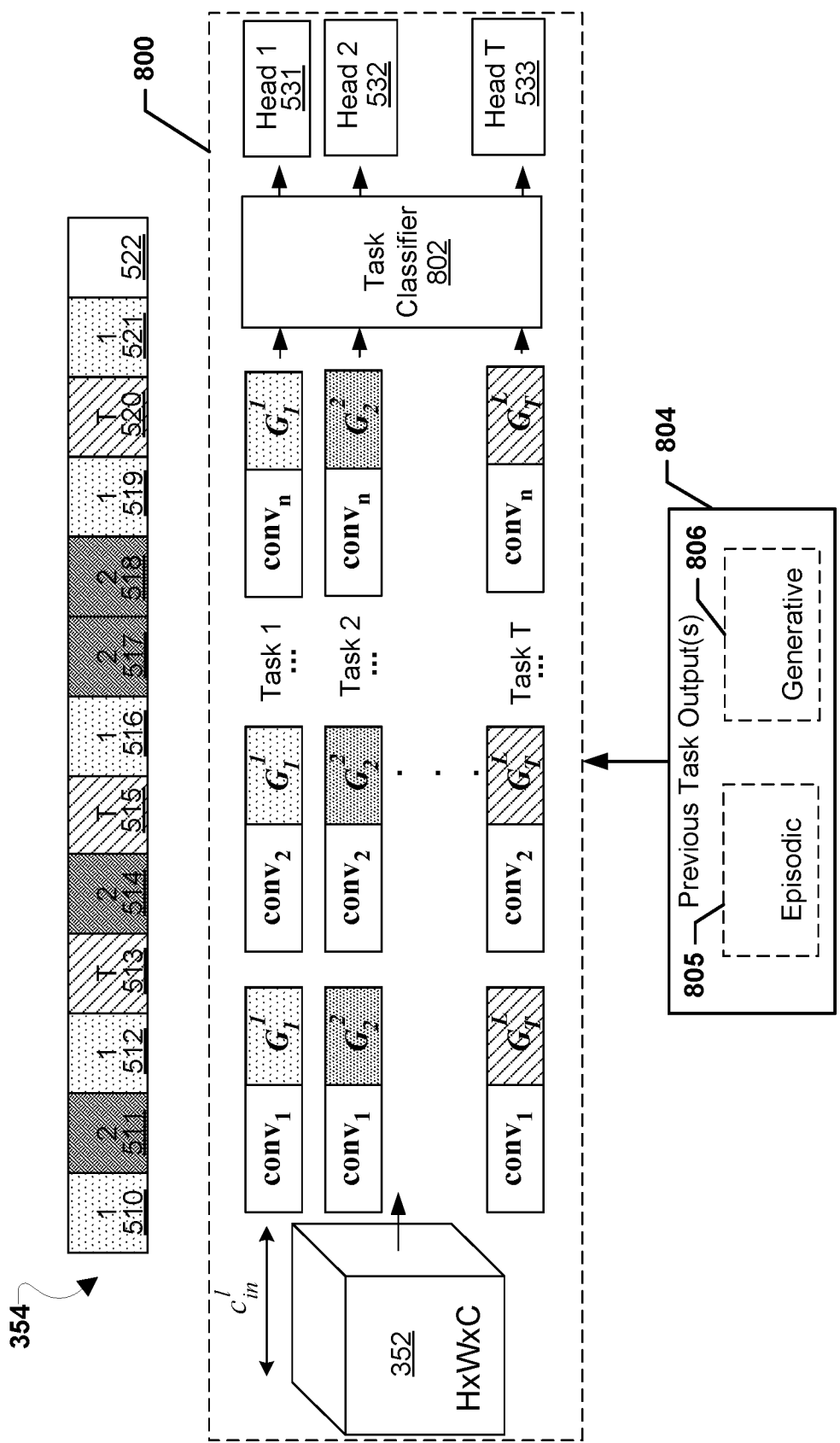
FIG. 8 is a functionality component block diagram illustrating interactions between functionality components in an example neural network to implement a generalized framework to accomplish learning in a single-head architecture in accordance with various embodiments.

FIG. 8 is a functionality component block diagram illustrating interactions between functionality components in an example neural network 800 to implement a generalized framework to accomplish learning, such as continual learning, in a single-head architecture in accordance with various embodiments. With reference to FIGS. 1A-8, the architecture of FIG. 8 is similar to FIG. 5, except the neural network 800 is task-agnostic (e.g., the task is not known at the start of test time). Just as the network 500 of FIG. 5 supports immediate identification of important kernels for past tasks, the network 800 supports identification of important kernels for past tasks, once the task is identified by a task classifier 802.

The task classifier 802 of the neural network 800 may support task-agnostic testing operations. All gating functionality components 400 $[G_1^l, \ldots, G_t^l]$ may be employed to propagate all gate layer outputs $[\hat{h}_1^{l+1}, \ldots, \hat{h}_t^{l+1}]$ forward. In turn, the following layer l+1 receives such list of gated outputs from layer l, applies its respective gating functionality components 400 $[G_1^{l+1}, \ldots, G_t^{l+1}]$ and yields the list of outputs $[\hat{h}_1^{l+2}, \ldots, \hat{h}_t^{l+2}]$. This mechanism generates parallel streams of computation in the network, sharing the same layers but selecting different sets of units to activate for each of them. Due to the fact that gating modules select a limited number of convolutional filters, the solution may be computationally cheaper than the backbone network, despite the fact that the number of parallel streams grows linearly with the number of tasks.

After the last convolutional layer L, a list of t candidate feature maps $[\hat{h}_1^{L+1}, \ldots, \hat{h}_t^{L+1}]$ i is given and as many classification heads. The task classifier 802 may be fed with a concatenation of all feature maps:

$$h = \bigoplus_{i=1}^{t} \left[ \mu(\hat{h}_i^L) \right],$$

where μ denotes the global average pooling operator spatial dimensions and ⊕ describes the concatenation along the feature axis. The architecture of the task classifier 802 may be based on a shallow MLP with one hidden layer featuring 64 ReLU units. A softmax layer may be employed to predict the task label. The task classifier 802 may be subject to catastrophic forgetting, which may be ameliorated by the addition of a memory 804, such as an episodic memory 805 or a generative memory 806, providing replay of previous task outputs.

In an episodic memory 805 implementation, replay of a small subset of examples from prior tasks to rehearse the task classifier 802. During training of task t, the buffer holds C random examples from past tasks 1, . . . , t−1 (where C identifies the fixed capacity). Examples from the buffer are sampled so that by merging them with examples from task t the distribution of task labels in the rehearsal batch is uniform. At the end of task t, the data in the buffer is subsampled so that each past task holds m=C÷t examples. Finally, m random examples from task t are selected for storage.

In a generative memory 806 implementation, a generative model is relied on for sampling fake data from prior tasks. Specifically, a Wasserstein Gans with Gradient Penalty (WGAN-GP) may be used. In order to overcome forgetting of the generators, two alternative solutions may be used. First, by employing multiple generators, each of which is devoted to modeling the distribution of examples of a specific task (G-multi). Then, a single deconvolutional generator may be trained incrementally by equipping each of its transposed convolution layers with the gating functionality components 400. This way, task-conditional generation is achieved. In order to generate examples from a generic task, such layers may be equipped with the corresponding gating modules that, in turn, will select the relevant kernels to be applied for the generation. This second setting may be referred to as G-single. In both cases, replay is only employed for the rehearsing of task prediction. On the contrary, no update is performed on task-specific classification heads.

Figure 9:
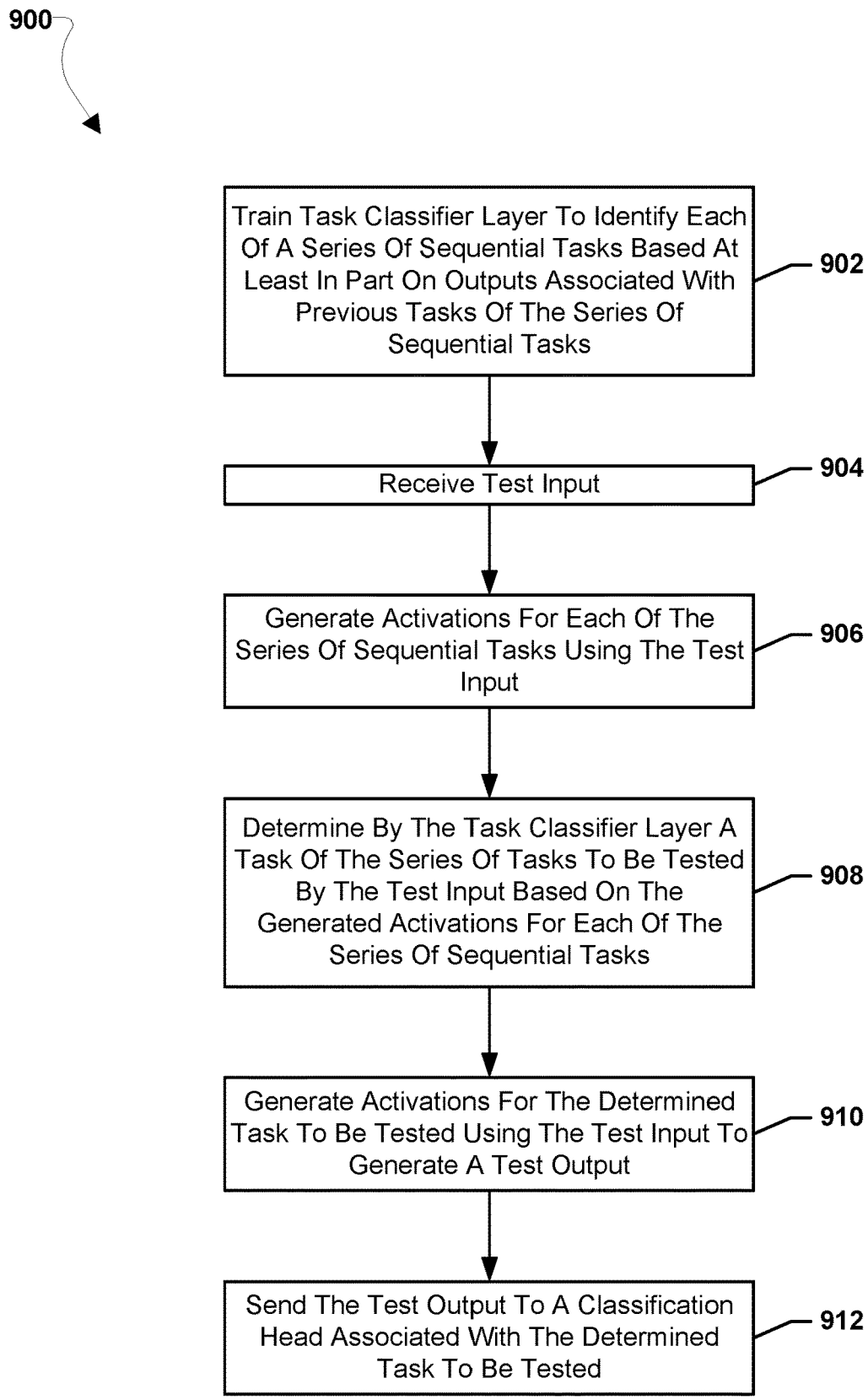
FIG. 9 is a process flow diagram illustrating a method for task classification in a neural network in accordance with various embodiments.

FIG. 9 illustrates a method 900 for task classification in a neural network in accordance with various embodiments. With reference to FIGS. 1A-9, method 900 may be performed by a processor in a computing system that implements all or portions of a neural network. Method 900 may be implemented in conjunction with method 600 (FIG. 6) and/or method 700 (FIG. 7). Means for performing functions of each of the operations in the method 900 include a processor, such as processor 1001 (FIG. 10).

In block 902, the processor may train a task classifier layer to identify each of a series of sequential tasks based at least in part on outputs associated with previous tasks of the series of sequential tasks. For example, the task classifier may be trained while the convolution layers of the neural network are being trained.

In block 904, the processor may receive a test input. For example, the input may be a test set, such as a channel of input feature maps 352.

In block 906, the processor may generate activations for each of the series of sequential tasks using the test input. Feature maps for each of the gating functionality components 400 of a convolution layer may generated and a concatenation of all feature maps may be fed to the task classifier.

In block 908, the processor may determine by the task classifier layer a task of the series of tasks to be tested by the test input based on the generated activations for each of the series of sequential tasks. In this manner, though the test was initiated in a task agnostic manner, the task may be determined by the neural network.

In block 910, the processor may generate activations for the determined task to be tested using the test input to generate a test output.

In block 912, the processor may send the test output to a classification head associated with the determined task to be tested.

Various embodiments are also described in the draft article "Conditional Computation for Continual Learning," which is attached hereto as Appendix A and is fully incorporated as part of this disclosure.

Various embodiments may be implemented on any of a variety of commercially available computing systems and computing devices, such as a server 1000 an example of which is illustrated in FIG. 10. With reference to FIGS. 1A-10, such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1005, such as a local area network coupled to other operator network computers and servers.

The processor 1001 may be any programmable microprocessor, microcomputer or multiple processor chip or chips that may be configured by software instructions (applications) to perform a variety of functions, including the functions of the various embodiments described in this application. In some wireless devices, multiple processors may be provided, such as one processor dedicated to wireless communication functions and one processor dedicated to running other applications. Typically, software applications may be stored on non-transitory processor-readable medium, such as a disk drive 1003, before the instructions are accessed and loaded into the processor. The processor 1001 may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor in a computing device to perform the operations of the methods of the following implementation examples.

Example 1. A method for learning in a neural network, comprising: receiving, by a processor in a computing device, input in a layer in the neural network, the layer including a plurality of filters; determining, by the processor, a first series of filters of the plurality of filters to apply to the received input based on the received input and a first task; and applying, by the processor, the first series of filters to the received input to generate an activation for the first task.

Example 2. The method of example 1, further comprising: determining, by the processor, a first set of important filters of the first series of filters upon completion of the first task; and fixing weight parameters of the first set of important filters by the processor such that the weight parameters of the first set of important filters cannot be updated during performance of tasks other than the first task.

Example 3. The method of example 2, further comprising, by the processor, re-initializing weight parameters of all filters of the plurality of filters not included in the first set of important filters before performing a next task.

Example 4. The method of any of examples 1-3, further comprising: determining, by the processor, a second series of filters of the plurality of filters to apply to the received input based on the received input and a second task; applying, by the processor, the second series of filters to the received input to generate an activation for the second task; determining, by the processor, a second set of important filters of the second series of filters upon completion of the second task, wherein the second set of important filters does not include any of the first set of important filters; and fixing weight parameters of the second set of important filters by the processor such that the weight parameters of the second set of important filters cannot be updated during performance of tasks other than the second task.

Example 5. The method of example 4, wherein the second series of filters of the plurality of filters includes one or more filters of the first set of important filters having fixed weight parameters.

Example 6. The method of any of examples 1-5, wherein determining the first series of filters of the plurality of filters to apply to the received input based on the received input and the first task, determining the first set of important filters of the first series of filters upon completion of the first task, and fixing weight parameters of the first set of important filters are performed by a first gating functionality component associated with the first task.

Example 7. The method of any of examples 1-6, wherein determining the second series of filters of the plurality of filters to apply to the received input based on the received input and the second task, determining the second set of important filters of the second series of filters upon completion of the second task, and fixing weight parameters of the second set of important filters are performed by a second gating functionality component associated with the second task.

Example 8. The method of any of examples 1-7, wherein the received input is a training set; and receiving the training set in the layer in the neural network is part of training the neural network for at least the first task and the second task.

Example 9. The method of any of examples 1-8, wherein: determining the first series of filters of the plurality of filters comprises determining the first series of filters of the plurality of filters at least in part according to a sparsity objective; and determining the second series of filters of the plurality of filters comprises determining the second series of filters of the plurality of filters at least in part according to the sparsity objective.

Example 10. The method of any of examples 1-9, wherein a series of sequential tasks to be learned by the neural network includes at least the first task and the second task, the method further comprising: training, by the processor, a task classifier layer of the neural network to identify each of the series of sequential tasks based at least in part on outputs associated with previous tasks of the series of sequential tasks.

Example 11. The method of example 10, wherein the outputs associated with the previous tasks of the series of sequential tasks are stored outputs of actual prior performances of the previous tasks of the series of sequential tasks.

Example 12. The method of example 10, wherein the outputs associated with the previous tasks of the series of sequential tasks are generated modeled outputs of the previous tasks of the series of sequential tasks generated at a time of training the current task.

Example 13. The method of any of examples 10-12, further comprising: receiving a test input in the layer by the processor; generating, by the processor, activations in the layer for each of the series of sequential tasks using the test input; and determining by the task classifier layer a task of the series of sequential tasks to be tested by the test input based on the generated activations for each of the series of sequential tasks from the layer.

Example 14. The method of example 13, further comprising: generating, by the processor, activations in the layer for the determined task to be tested using the test input to generate a test output; and sending, by the processor, the test output to a classification head associated with the determined task to be tested.

Example 15. The method of example 2, wherein determining the first set of important filters of the first series of filters upon completion of the first task comprises determining the first set of important filters as filters of the first series of filters that have a firing probability at or above a probability threshold.

Example 16. The method of any of examples 1-15, further comprising: determining, by the processor, a number of remaining filters from the plurality of filters that have not been designated as important filters prior to performing a next task; determining, by the processor, a threshold for needed filters based at least in part on a number of remaining tasks to be performed prior to performing the next task; determining, by the processor, whether the number of remaining filters is below the determined threshold for needed filters prior to performing the next task; and prior to performing the next task, adding filters to the plurality of filters by the processor in response to determining that the number of remaining filters is below the determined threshold for needed filters.

Example 17. The method of any of examples 1-16, wherein the layer is a convolution layer.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, functionality components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for learning in a neural network implemented by at least one processor of a computing device, comprising:

processing, by a first gating functionality component of a first layer of the neural network, a received input to generate a mask indicating a first series of filters of a plurality of filters of the first layer of the neural network to apply to the received input for a first task of a plurality of tasks of the neural network, wherein the neural network includes a plurality of gating functionality components associated with the plurality of tasks of the neural network, the plurality of gating functionality components including the first gating functionality component associated with the first task of the neural network, and a second gating functionality component associated with the first task and a second layer of the neural network;

determining the first series of filters of the plurality of filters to apply to the received input for the first task based on the indication of the first series of filters in the mask generated by the first gating functionality component associated with the first task;

applying the first series of filters to the received input to generate a sparse feature map for the first task of the neural network; and outputting the sparse feature map for processing by the second layer of the neural network.

2. The method of claim 1, further comprising:
determining a first set of important filters of the first series of filters upon completion of the first task; and
fixing weight parameters of the first set of important filters such that the weight parameters of the first set of important filters cannot be updated during performance of tasks other than the first task.

3. The method of claim 2, further comprising re-initializing weight parameters of all filters of the plurality of filters not included in the first set of important filters before performing a next task.

4. The method of claim 2, further comprising:
determining a second series of filters of the plurality of filters to apply to the received input based on the received input and a second task of the neural network;
applying the second series of filters to the received input to generate an activation for the second task;
determining a second set of important filters of the second series of filters upon completion of the second task, wherein the second set of important filters does not include any of the first set of important filters; and
fixing weight parameters of the second set of important filters such that the weight parameters of the second set of important filters cannot be updated during performance of tasks other than the second task.

5. The method of claim 4, wherein the second series of filters of the plurality of filters includes one or more filters of the first set of important filters having fixed weight parameters.

6. The method of claim 4, wherein determining the first set of important filters of the first series of filters upon completion of the first task and fixing weight parameters of the first set of important filters are performed by the first gating functionality component associated with the first task.

7. The method of claim 6, wherein determining the second series of filters of the plurality of filters to apply to the received input based on the received input and the second task, determining the second set of important filters of the second series of filters upon completion of the second task, and fixing weight parameters of the second set of important filters are performed by a second gating functionality component associated with the second task of the neural network by of the plurality of gating functionality components associated with the plurality of tasks of the neural network.

8. The method of claim 4, wherein the received input is a training set, and further comprising receiving the training set in the first layer in the neural network as part of training the neural network for at least the first task and the second task.

9. The method of claim 4, wherein:
determining the first series of filters of the plurality of filters comprises determining the first series of filters of the plurality of filters at least in part according to a sparsity objective; and
determining the second series of filters of the plurality of filters comprises determining the second series of filters of the plurality of filters at least in part according to the sparsity objective.

10. The method of claim 4, wherein a series of sequential tasks to be learned by the neural network includes at least the first task and the second task, the method further comprising:
training a task classifier layer of the neural network to identify each of the series of sequential tasks based at least in part on outputs associated with previous tasks of the series of sequential tasks.

11. The method of claim 10, wherein the outputs associated with the previous tasks of the series of sequential tasks are stored outputs of actual prior performances of the previous tasks of the series of sequential tasks.

12. The method of claim 11, wherein the outputs associated with the previous tasks of the series of sequential tasks are generated modeled outputs of the previous tasks of the series of sequential tasks generated at a time of training a current task.

13. The method of claim 10, further comprising:
receiving a test input in the first layer;
generating activations in the first layer for each of the series of sequential tasks using the test input; and
determining by the task classifier layer a task of the series of sequential tasks to be tested by the test input based on the generated activations for each of the series of sequential tasks from the first layer.

14. The method of claim 13, further comprising:
generating activations in the first layer for the determined task to be tested using the test input to generate a test output; and
sending the test output to a classification head associated with the determined task to be tested.

15. The method of claim 2, wherein determining the first set of important filters of the first series of filters upon completion of the first task comprises determining the first set of important filters as filters of the first series of filters that have a firing probability at or above a probability threshold.

16. The method of claim 1, further comprising:
determining a number of remaining filters from the plurality of filters that have not been designated as important filters prior to performing a next task;
determining a threshold for needed filters based at least in part on a number of remaining tasks to be performed prior to performing the next task;
determining whether the number of remaining filters is below the determined threshold for needed filters prior to performing the next task; and
prior to performing the next task, adding filters to the plurality of filters in response to determining that the number of remaining filters is below the determined threshold for needed filters.

17. The method of claim 1, wherein the first layer is a convolution layer.

18. A computing device, comprising:
a processor configured with a plurality of gating functionality components associated with a plurality of tasks of a neural network and processor-executable instructions to:
  process, by a first gating functionality component of a first layer of the neural network, a received input to generate a mask indicating a first series of filters of a plurality of filters of the first layer of the neural network to apply to the received input for a first task of a plurality of tasks of the neural network, wherein the neural network includes a plurality of gating functionality components associated with the plurality of tasks of the neural network, the plurality of gating functionality components including the first gating functionality component associated with the first task of the neural network, and a second gating functionality component associated with the first task and a second layer of the neural network;
  determine the first series of filters of the plurality of filters to apply to the received input for the first task based on the indication of the first series of filters in the mask generated by the first gating functionality component associated with the first task;
  apply the first series of filters to the received input to generate a sparse feature map for the first task of the neural network; and
  output the sparse feature map for processing by the second layer of the neural network.

19. The computing device of claim 18, wherein the processor is further configured with processor-executable instructions to:
  determine a first set of important filters of the first series of filters upon completion of the first task; and
  fix weight parameters of the first set of important filters such that the weight parameters of the first set of important filters cannot be updated during performance of tasks other than the first task.

20. The computing device of claim 19, wherein the processor is further configured with processor-executable instructions to:
  determine a second series of filters of the plurality of filters to apply to the received input based on the received input and a second task of the neural network;
  apply the second series of filters to the received input to generate an activation for the second task;
  determine a second set of important filters of the second series of filters upon completion of the second task, wherein the second set of important filters does not include any of the first set of important filters; and
  fix weight parameters of the second set of important filters such that the weight parameters of the second set of important filters cannot be updated during performance of tasks other than the second task.

21. The computing device of claim 20, wherein the processor is further configured with processor-executable instructions to:
  determine the first set of important filters of the first series of filters upon completion of the first task and fix weight parameters of the first set of important filters by the first gating functionality component associated with the first task; and
  determine the second series of filters of the plurality of filters to apply to the received input based on the received input and the second task, determine the second set of important filters of the second series of filters upon completion of the second task, and fix weight parameters of the second set of important filters are performed by a second gating functionality component associated with the second task of the neural network of the plurality of gating functionality components associated with the plurality of tasks of the neural network.

22. The computing device of claim 20, wherein:
the received input is a training set; and
the processor is further configured with processor-executable instructions to receive the training set in the first layer in the neural network as part of training the neural network for at least the first task and the second task.

23. The computing device of claim 20, wherein the processor is further configured with processor-executable instructions to:
  determine the first series of filters of the plurality of filters by determining the first series of filters of the plurality of filters at least in part according to a sparsity objective; and
  determine the second series of filters of the plurality of filters by determining the second series of filters of the plurality of filters at least in part according to the sparsity objective.

24. The computing device of claim 20, wherein the processor is further configured with processor-executable instructions to:
  receive a series of sequential tasks to be learned by the neural network including at least the first task and the second task; and
  to train a task classifier layer of the neural network to identify each of the series of sequential tasks based at least in part on outputs associated with previous tasks of the series of sequential tasks.

25. The computing device of claim 24, wherein the series of sequential tasks comprises stored outputs of actual prior performances of the previous tasks of the series of sequential tasks.

26. The computing device of claim 24, wherein the processor is further configured with processor-executable instructions to:
  receive a test input in the first layer;
  generate activations in the first layer for each of the series of sequential tasks using the test input; and
  determine by the task classifier layer a task of the series of sequential tasks to be tested by the test input based on the generated activations for each of the series of sequential tasks from the first layer.

27. The computing device of claim 26, wherein the processor is further configured with processor-executable instructions to:
  generate activations in the first layer for the determined task to be tested using the test input to generate a test output; and
  send the test output to a classification head associated with the determined task to be tested.

28. The computing device of claim 18, wherein the processor is further configured with processor-executable instructions to:
  determine a number of remaining filters from the plurality of filters that have not been designated as important filters prior to performing a next task;
  determine a threshold for needed filters based at least in part on a number of remaining tasks to be performed prior to performing the next task;
  determine whether the number of remaining filters is below the determined threshold for needed filters prior to performing the next task; and prior to performing the next task, add filters to the plurality of filters by the processor in response to determining that the number of remaining filters is below the determined threshold for needed filters.

29. A non-transitory processor-readable storage medium having stored thereon processor-executable instructions to cause a processor in a computing device executing a neural network comprising:
- processing, by a first gating functionality component of a first layer of the neural network, a received input to generate a mask indicating a first series of filters of a plurality of filters of the first layer of the neural network to apply to the received input for a first task of a plurality of tasks of the neural network, wherein the neural network includes a plurality of gating functionality components associated with the plurality of tasks of the neural network, the plurality of gating functionality components including the first gating functionality component associated with the first task of the neural network, and a second gating functionality component associated with the first task and a second layer of the neural network;
- determining the first series of filters of the plurality of filters to apply to the received input for the first task based on the indication of the first series of filters in the mask generated by the first gating functionality component associated with the first task of the neural network;
- applying the first series of filters to the received input to generate a sparse feature map for the first task of the neural network; and
- outputting the sparse feature map for processing by the second layer of the neural network.

30. A computing device, comprising:
- means for processing, by a first gating functionality component of a first layer of a neural network, a received input to generate a mask indicating a first series of filters of a plurality of filters of the first layer of the neural network to apply to the received input for a first task of a plurality of tasks of the neural network, wherein the neural network includes a plurality of gating functionality components associated with the plurality of tasks of the neural network, the plurality of gating functionality components including the first gating functionality component associated with the first task of the neural network, and a second gating functionality component associated with the first task and a second layer of the neural network;
- means for determining the first series of filters of the plurality of filters to apply to the received input for the first task based on the indication of the first series of filters in the mask generated by the first gating functionality component associated with the first task;
- means for applying the first series of filters to the received input to generate a sparse feature map for the first task of the neural network; and
- means for outputting the sparse feature map for processing by the second layer of the neural network.

* * * * *